United States Patent
Ishida

(10) Patent No.: US 9,151,986 B2
(45) Date of Patent: Oct. 6, 2015

(54) DISCHARGE METHOD, CONTINUOUS FILM FORMATION METHOD, ALIGNMENT FILM FORMATION METHOD, METHOD FOR FORMING LIQUID CRYSTAL DISPLAY DEVICE, HEAD UNIT, DROPLET DISCHARGE DEVICE, AND ELECTRONIC APPARATUS

(75) Inventor: Kohei Ishida, Nagano (JP)

(73) Assignee: Seiko Epson Corporation, Tokyo (JP)

(*) Notice: Subject to any disclaimer, the term of this patent is extended or adjusted under 35 U.S.C. 154(b) by 1490 days.

(21) Appl. No.: 12/207,673

(22) Filed: Sep. 10, 2008

(65) Prior Publication Data

US 2009/0092761 A1    Apr. 9, 2009

(30) Foreign Application Priority Data

Oct. 3, 2007   (JP) ................................ 2007-259485

(51) Int. Cl.
     *G02F 1/1337*     (2006.01)
     *G02F 1/13*       (2006.01)

(52) U.S. Cl.
     CPC ........ *G02F 1/133711* (2013.01); *G02F 1/1303* (2013.01)

(58) Field of Classification Search
     USPC ........................... 427/58, 256; 347/11, 12, 13
     See application file for complete search history.

(56) References Cited

U.S. PATENT DOCUMENTS

| | | | |
|---|---|---|---|
| 6,874,883 B1* | 4/2005 | Shigemura et al. | 347/106 |
| 7,535,544 B2 | 5/2009 | Hiruma | |
| 2002/0054197 A1* | 5/2002 | Okada et al. | 347/101 |
| 2003/0142167 A1* | 7/2003 | Nakamura et al. | 347/37 |
| 2004/0246298 A1* | 12/2004 | Ito et al. | 347/40 |
| 2006/0051498 A1* | 3/2006 | Katagami et al. | 427/66 |
| 2006/0188308 A1* | 8/2006 | Tanaka et al. | 400/62 |
| 2006/0227157 A1* | 10/2006 | Drake et al. | 347/13 |

FOREIGN PATENT DOCUMENTS

| | | |
|---|---|---|
| JP | 2002-178488 A | 6/2002 |
| JP | 2002-196127 A | 7/2002 |
| JP | 2005-118633 A | 5/2005 |
| JP | 2006-82047 A | 3/2006 |
| KR | 10-2004-0100999 A | 12/2004 |

* cited by examiner

*Primary Examiner* — J. Christopher Ball
*Assistant Examiner* — Maris R Kessel
(74) *Attorney, Agent, or Firm* — Global IP Counselors, LLP

(57) ABSTRACT

A discharge method is provided for discharging a fluid from nozzle sets having nozzles arrayed between first and second end portions. The method includes classifying each of the nozzle sets into one of a first nozzle group having a distribution characteristic in which a discharge quantity at the second end portion is greater than the discharge quantity at the first end portion, a second nozzle group having the distribution characteristic in which the discharge quantity at the first end portion is greater than the discharge quantity at the second end portion, and a third nozzle group having the distribution characteristic in which the discharge quantity at the first end portion is substantially the same as the discharge quantity at the second end portion. The method also includes forming a nozzle formation including the nozzle sets classified as the first nozzle group, the second nozzle group and/or the third nozzle group.

10 Claims, 17 Drawing Sheets

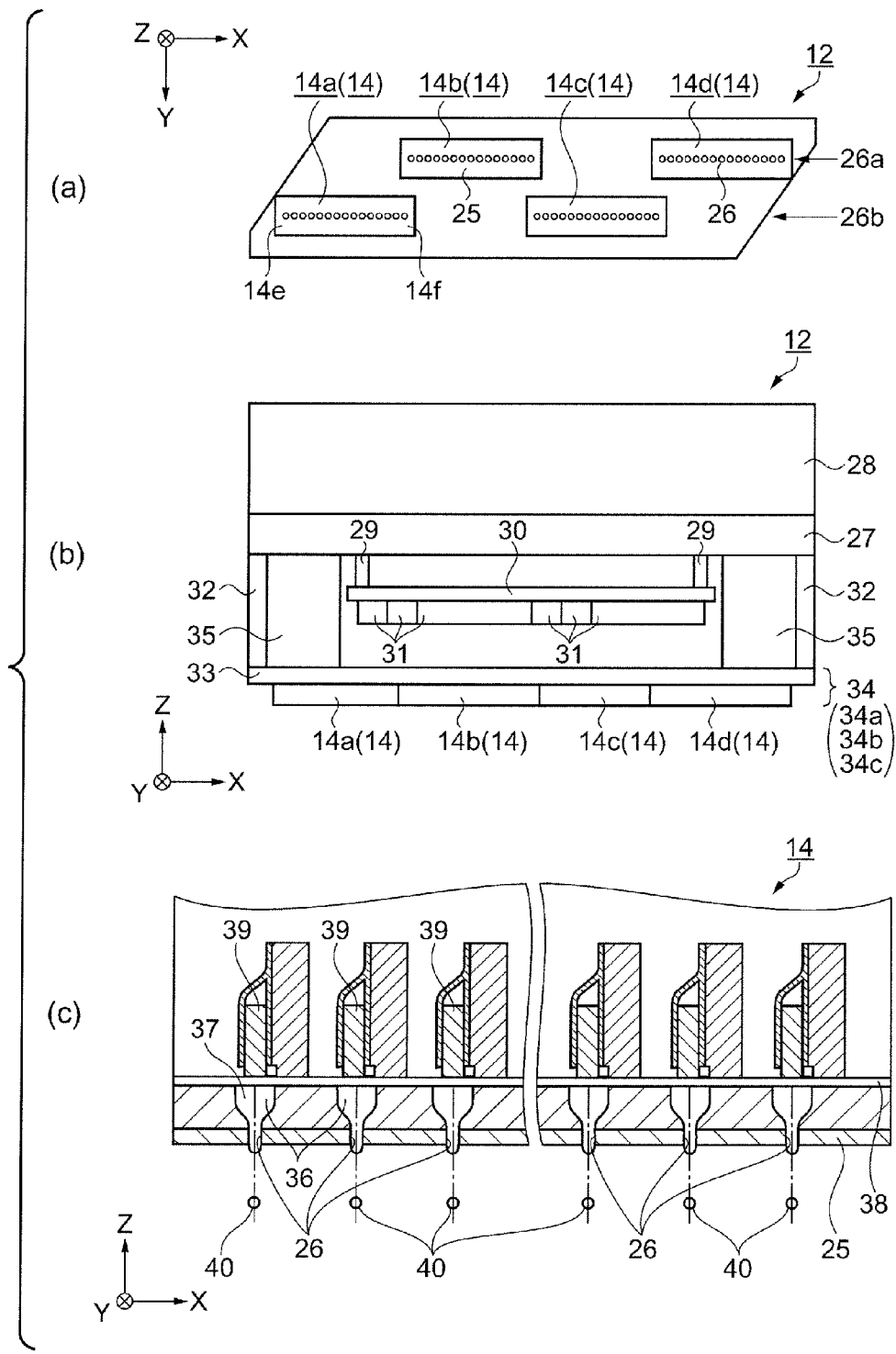
F I G. 2

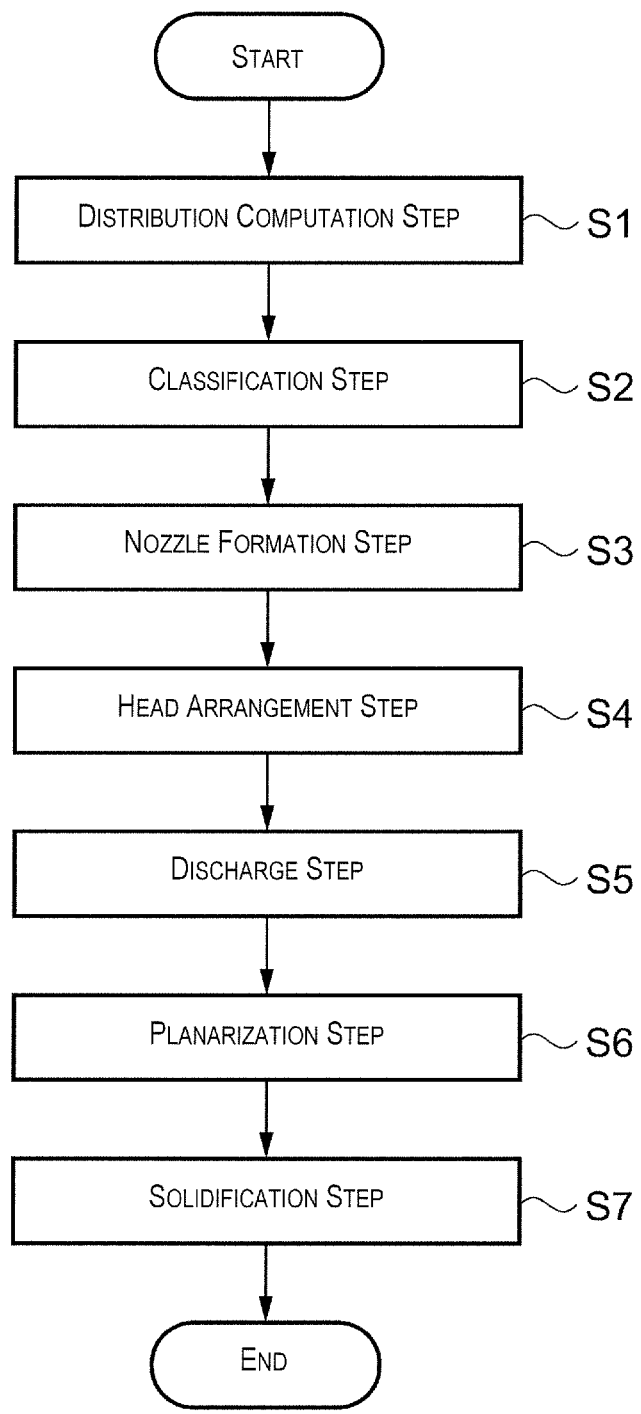
F I G. 4

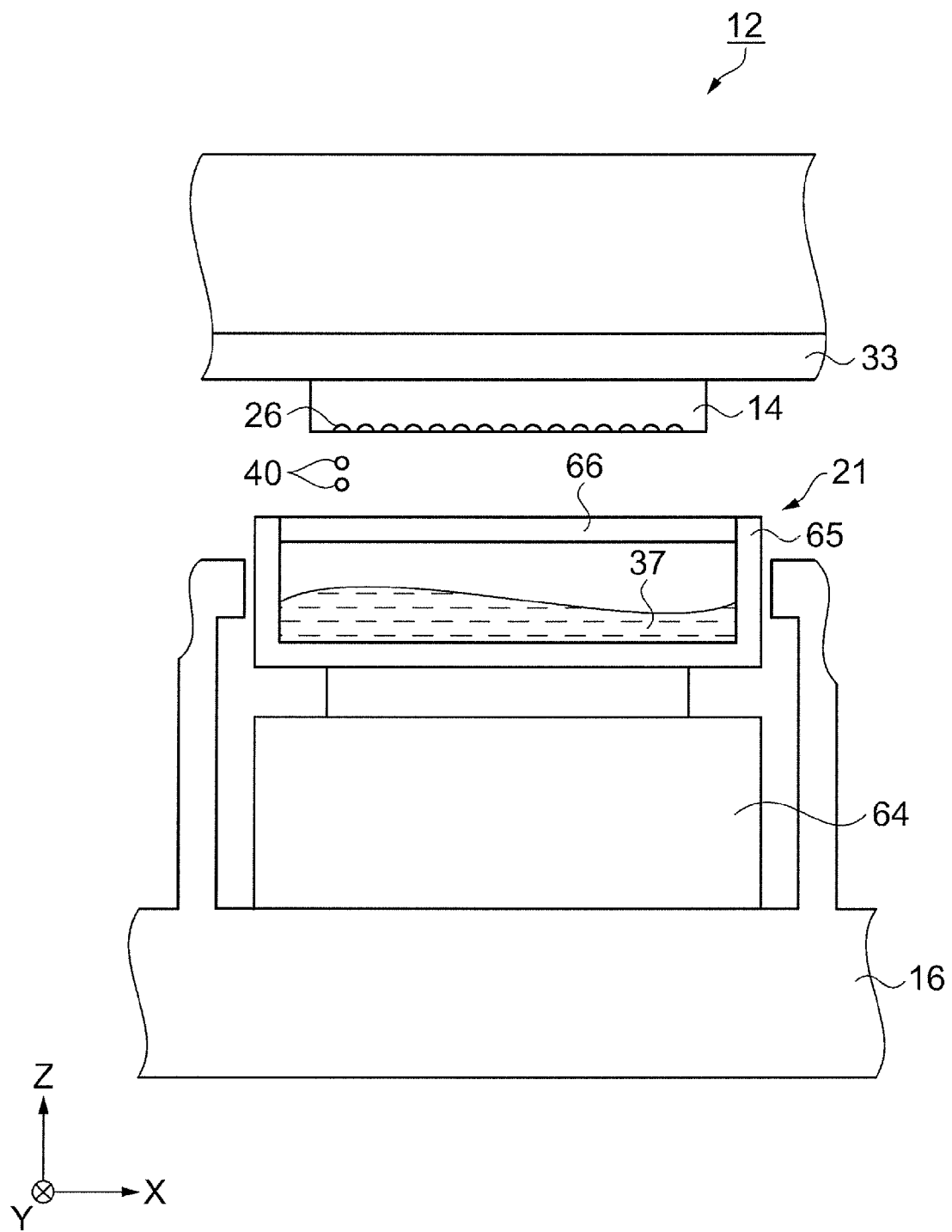
F I G. 5

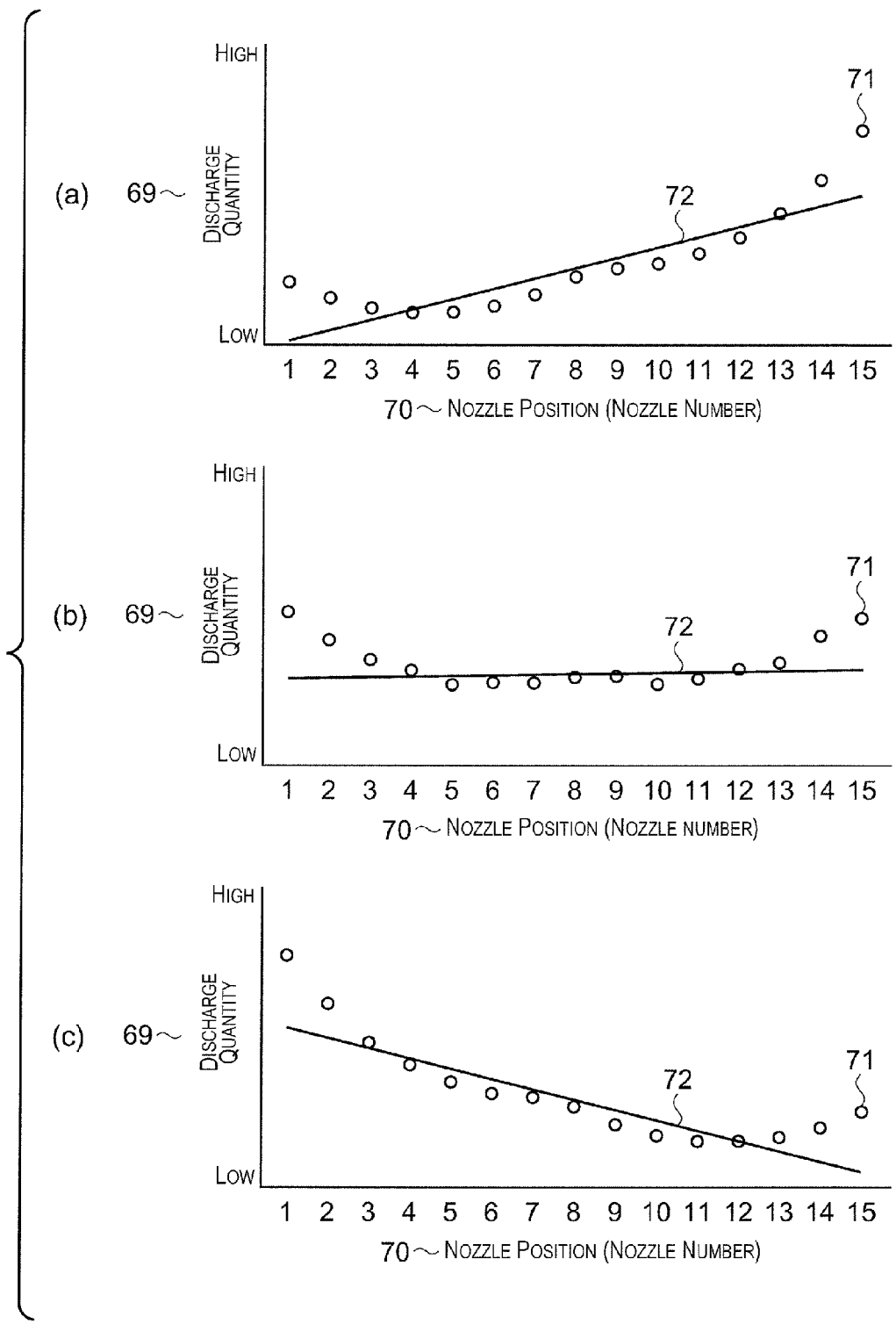
F I G. 6

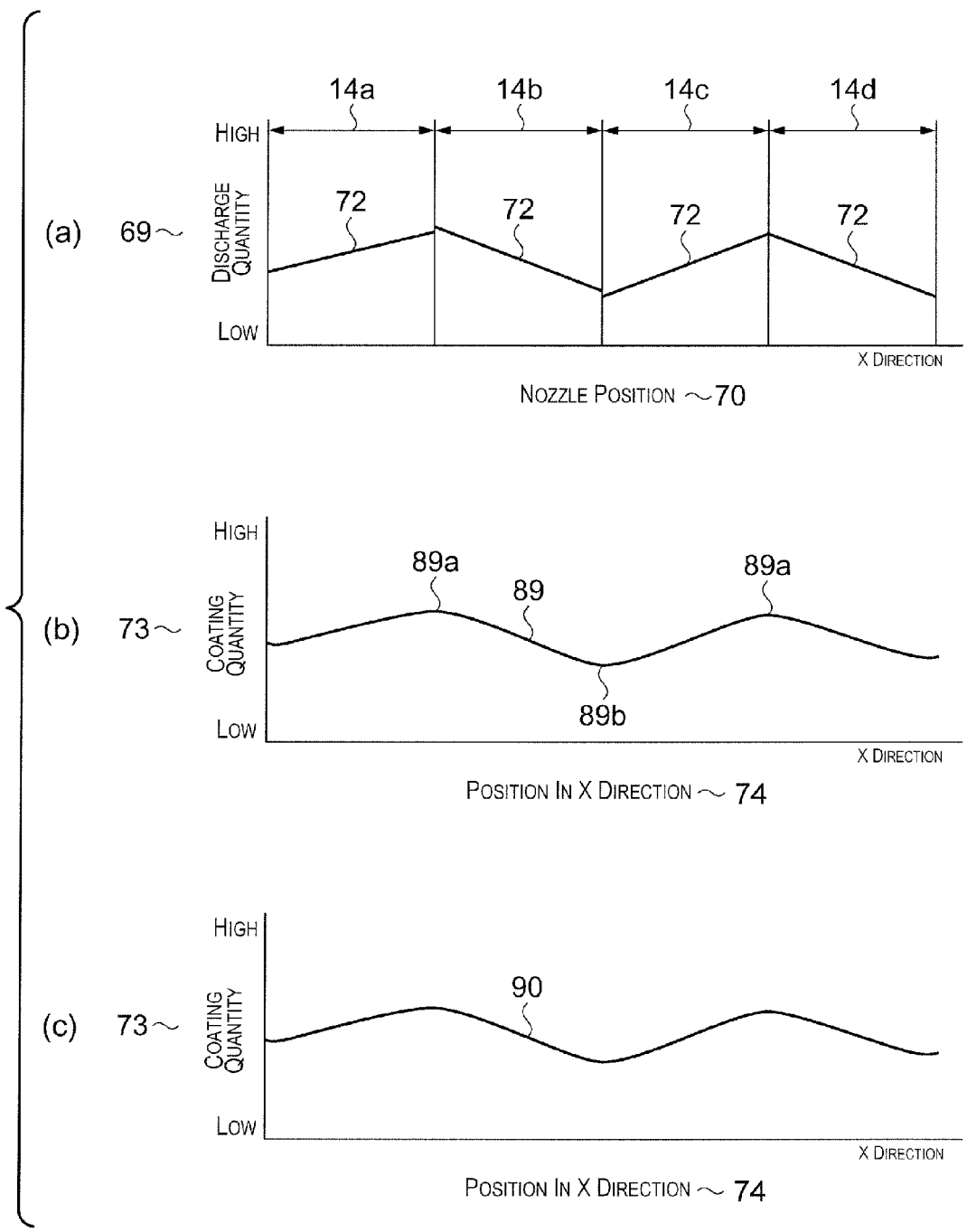
F I G. 9

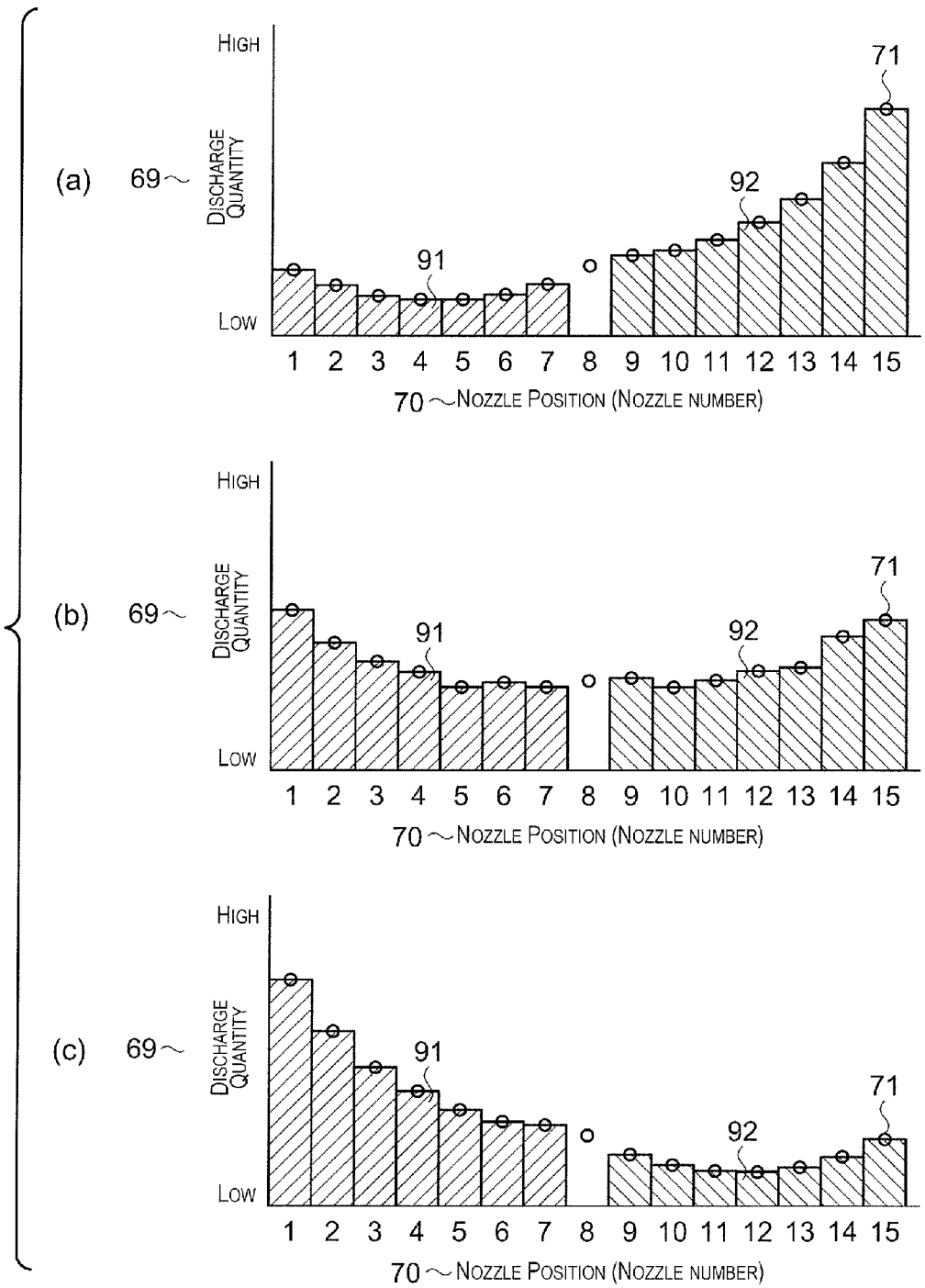
F I G. 13

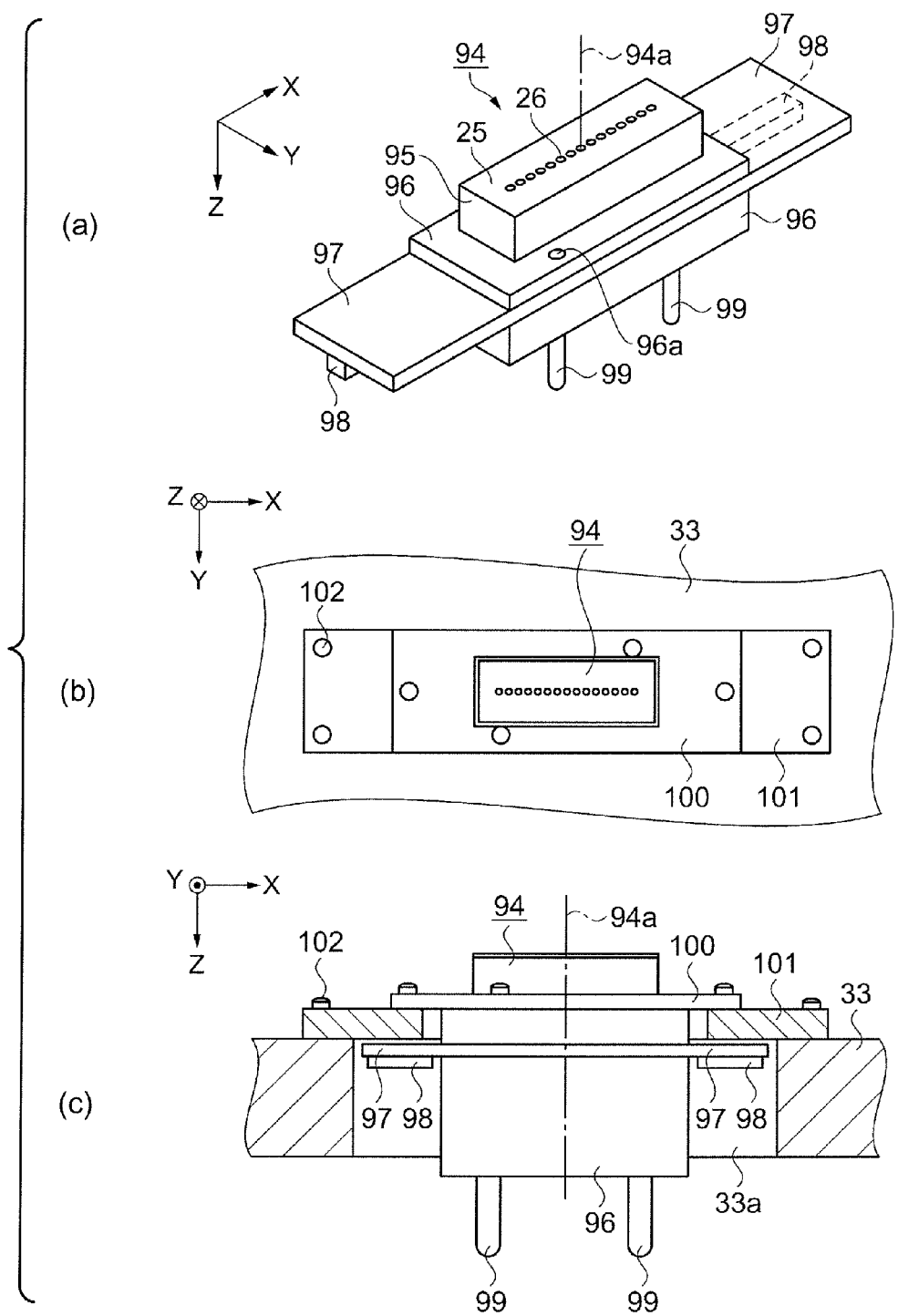
F I G. 14

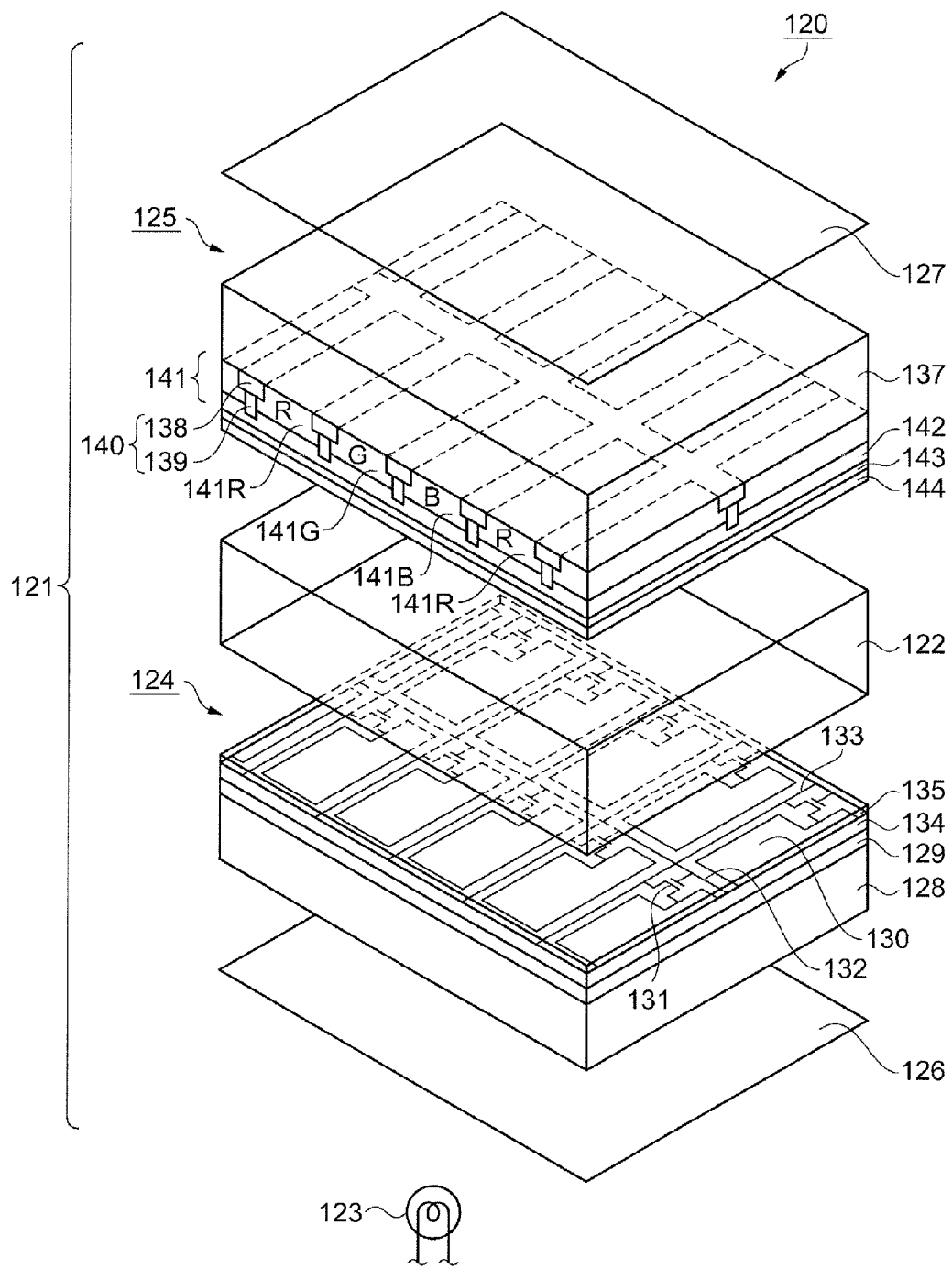
F I G. 16

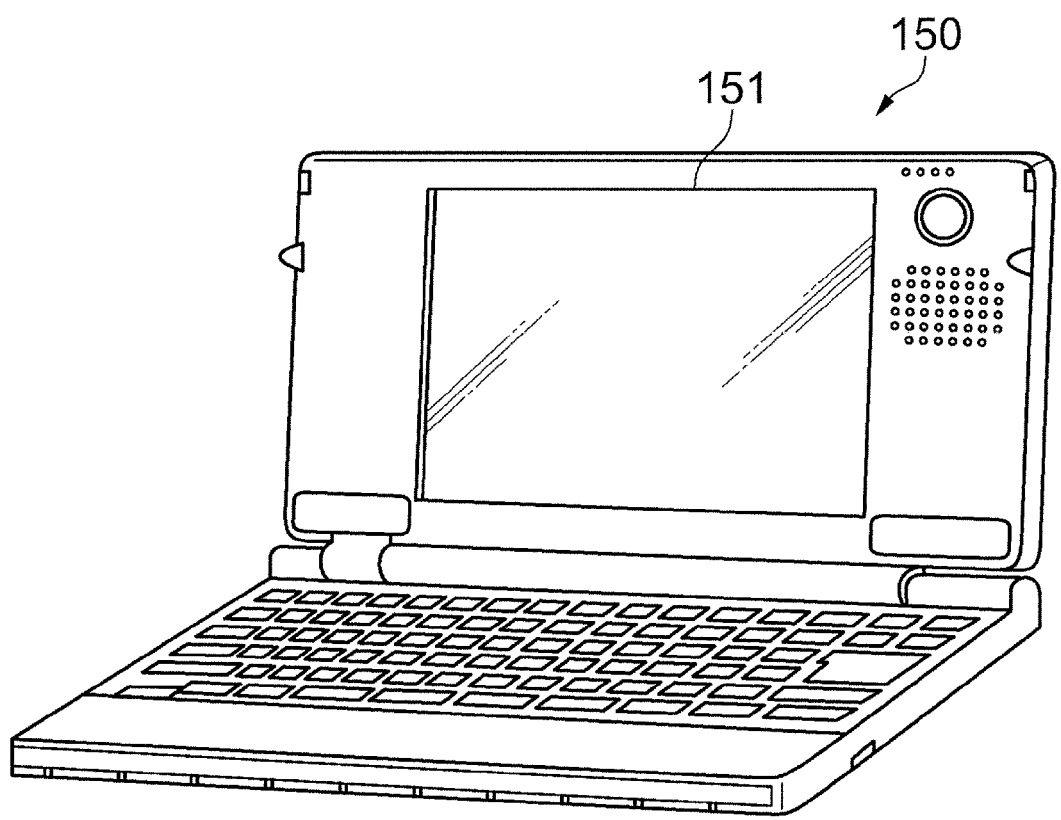
F I G. 17

DISCHARGE METHOD, CONTINUOUS FILM FORMATION METHOD, ALIGNMENT FILM FORMATION METHOD, METHOD FOR FORMING LIQUID CRYSTAL DISPLAY DEVICE, HEAD UNIT, DROPLET DISCHARGE DEVICE, AND ELECTRONIC APPARATUS

CROSS-REFERENCE TO RELATED APPLICATIONS

This application claims priority to Japanese Patent Application No. 2007-259485 filed on Oct. 3, 2007. The entire disclosure of Japanese Patent Application No. 2007-259485 is hereby incorporated herein by reference.

BACKGROUND

1. Technical Field

The present invention relates to a discharge method, a continuous film formation method, an alignment film formation method, and a method for forming a liquid crystal display device, as well as a head unit, a droplet discharge device, and an electronic apparatus, and particularly relates to a method for reducing variance in thickness.

2. Related Art

Electronic apparatuses in which liquid crystal display devices are used as the display units are widely used. The liquid crystal display devices are formed by laminating two substrates together via a liquid crystal. An alignment film which has undergone an alignment treatment is formed on the substrates. A coating method is disclosed in Japanese Laid-Open Patent Application No. 2005-118633 in which an inkjet method, for example, is used as the method for forming an alignment film on the substrates. This is a method for coating an alignment film solution on the surface of the substrates by discharging the alignment film solution containing an alignment film formation material as droplets from the nozzles while a discharge head (hereinafter referred to as droplet discharge head) in which a plurality of nozzles are arrayed is moved relative to the substrates.

The discharge quantity of the droplets discharged from the nozzles differs depending on the nozzle location. A method for making the discharge quantity uniform is disclosed in Japanese Laid-Open Patent Application No. 2002-196127. In accordance with this method, the discharge quantity can be made uniform by controlling the drive signal for driving the droplet discharge head. For example, the drive voltage in locations where the discharge quantity is high is reduced and the drive voltage in locations where the discharge quantity is low is increased. The discharge quantity is made uniformed by driving the droplet discharge head using a plurality of drive signals. In other words, a film having a uniform thickness is formed by making the discharge quantity of the nozzles uniform in the droplet discharge head and performing discharge.

SUMMARY

However, in the prior arts, a drive circuit is required for supplying a plurality of drive voltages to each droplet discharge head in order to form a film having a uniform thickness. When a drive circuit for supplying a plurality of drive voltages is not present, it is difficult to form a film having a uniform thickness.

The present invention was contrived in order to solve at least some of the problems described above, and can be implemented in the following modes and application examples.

A discharge method according to the first aspect is provided for discharging a fluid from a plurality of nozzle sets onto a workpiece with each of the nozzle sets having a plurality of nozzles arrayed between a first end portion and a second end portion of the nozzle set. The method includes: measuring a discharge quantity of the fluid from each of the nozzles of each of the nozzle sets and computing a distribution characteristic of the discharge quantities from the nozzles in each of the nozzle sets; classifying each of the nozzle sets into one of a first nozzle group having the distribution characteristic in which the discharge quantity at the second end portion is greater than the discharge quantity at the first end portion, and a second nozzle group having the distribution characteristic in which the discharge quantity at the first end portion is greater than the discharge quantity at the second end portion; forming one of a first nozzle formation including the nozzle sets classified as the first nozzle group and a second nozzle formation including the nozzle sets classified as the second nozzle group; discharging the fluid onto the workpiece by using one of the first nozzle formation and the second nozzle formation; and planarizing the discharged fluid by leaving the discharged fluid to stand on the workpiece.

In accordance with this discharge method, the distribution of the discharge quantity is computed and the nozzle sets are classified into first nozzle group and second nozzle group. The first nozzle formation has the first nozzle groups disposed adjacent to each other. The second end portion of one of the first nozzle groups is adjacent to the first end portion of another of the first nozzle groups. In this case, the first nozzle groups have a discharge quantity at the second end portion that is greater than the discharge quantity of the first end portion. In other words, the location where the discharge quantity of the first nozzle groups is high is disposed adjacent to the location where the discharge quantity is low.

Fluid is discharged from the nozzles of the first nozzle formation. The discharged fluid spreads on the workpiece. When the location in which the discharge quantity is high and the location in which the discharge quantity is low are adjacent to each other, the surface tension of the fluid acts on the surface of the fluid to cause the fluid coated in a high discharge quantity to flow to locations coated with a low discharge quantity. In a similar manner, when coating is carried out using the second nozzle formation, the fluid coated in a high discharge quantity flows to locations coated with a low discharge quantity. Therefore, the variance of the thickness can be reduced because the thickness of the coated fluid is averaged out.

A discharge method according to the second aspect is provided for discharging a fluid from a plurality of nozzle sets onto a workpiece with each of the nozzle sets having a plurality of nozzles arrayed between a first end portion and a second end portion of the nozzle set. The method includes: measuring a discharge quantity of the fluid from each of the nozzles of each of the nozzle sets and computing a distribution characteristic of the discharge quantities from the nozzles in each of the nozzle sets; classifying each of the nozzle sets into one of a first nozzle group having the distribution characteristic in which the discharge quantity at the second end portion is greater than the discharge quantity at the first end portion, a second nozzle group having the distribution characteristic in which the discharge quantity at the first end portion is greater than the discharge quantity at the second end portion, and a third nozzle group having the distribution characteristic in which the discharge quantity at the first end portion is substantially the same as the discharge quantity at the second end portion, forming one of a fourth nozzle formation including at least one of the nozzle sets classified as the first nozzle group and at least one of the nozzle sets classified as the third nozzle group, and a fifth nozzle formation including at least one of the nozzle sets classified as the second nozzle group and at least one of the nozzle sets classified as the third nozzle group; discharging the fluid onto the workpiece by using one of the fourth nozzle formation and the fifth nozzle formation; and planarizing the discharged fluid by leaving the discharged fluid to stand on the workpiece.

In accordance with this discharge method, the distribution of the discharge quantity is calculated and the discharge quantity is classified into first nozzle group, second nozzle group, and third nozzle group. A fourth nozzle formation has the first nozzle groups disposed adjacent to each other, or the third nozzle groups disposed adjacent to the first nozzle groups. The second end portion of one of the first nozzle groups, and the first end portion of another of the first nozzle groups or a first end portion of the third nozzle group are disposed adjacent to each other. In this case, first nozzle groups have a discharge quantity that is greater at the second end portion than the discharge quantity at the first end portion. The third nozzle groups have a discharge quantity at the first end portion that is substantially the same as the discharge quantity at the second end portion. In other words, disposed adjacent to each other are the location where the discharge quantity of the first nozzle groups is high and the location where the discharge quantity is low, or the locations where the discharge quantity is substantially intermediate.

A fluid is discharged from the nozzles of the fourth nozzle formation. The discharged fluid spreads on the workpiece. When a location having a high discharge quantity and a location having a low discharge quantity are adjacent to each other, or when locations having discharge quantities that are substantially intermediate are adjacent to each other, the surface tension of the functional liquid has an effect whereby the functional liquid coated in a high discharge quantity flows to locations coated with a low discharge quantity, or to locations in which the discharge quantity is substantially intermediate. In the case that coating is carried out using a fifth nozzle formation, the fluid coated in a high discharge quantity similarly flows to locations coated with a low discharge quantity, or to locations in which the discharge quantity is substantially intermediate. Therefore, the thickness of the fluid thus coated is smoothed and the variance of the thickness can therefore be reduced.

A discharge method according to the third aspect is provided for discharging a fluid from a plurality of nozzle sets onto a workpiece with each of the nozzle sets having a plurality of nozzles arrayed between a first end portion and a second end portion of the nozzle set. The method includes: measuring a discharge quantity of the fluid from each of the nozzles of each of the nozzle sets and computing a distribution characteristic of the discharge quantities from the nozzles in each of the nozzle sets; selecting the nozzle sets classified as a third nozzle group having the distribution characteristic in which the discharge quantity at the first end portion is substantially the same as the discharge quantity at the second end portion, forming a third nozzle formation including the nozzle sets classified as the third nozzle group; discharging the fluid onto the workpiece by using the third nozzle formation; and planarizing the discharged fluid by leaving the discharged fluid to stand on the workpiece.

In accordance with this discharge method, the distribution of the discharge quantity is computed and third nozzle groups are classified. In the third nozzle formation, the third nozzle groups are disposed adjacent to each other. In this case, the third nozzle groups have a discharge quantity at the first end portion and a discharge quantity at the second end portion that are substantially the same. In other words, nozzle groups are arranged in which the discharge quantities of the two ends of the nozzle groups are substantially the same. Therefore, the variance of the thickness can be reduced because the thickness of the coated fluid is a thickness of substantially equal quantity.

A discharge method according to the fourth aspect is provided for discharging a fluid from a plurality of nozzle sets onto a workpiece with each of the nozzle sets having a plurality of nozzles arrayed between a first end portion and a second end portion of the nozzle set. The method includes: measuring a discharge quantity of the fluid from each of the nozzles of each of the nozzle sets and computing a distribution characteristic of the discharge quantities from the nozzles in each of the nozzle sets; classifying each of the nozzle sets into one of first nozzle group having the distribution characteristic in which the discharge quantity at the second end portion is greater than the discharge quantity at the first end portion, a second nozzle group having the distribution characteristic in which the discharge quantity at the first end portion is greater than the discharge quantity at the second end portion, and a third nozzle group having the distribution characteristic in which the discharge quantity at the first end portion is substantially the same as the discharge quantity at the second end portion, forming a sixth nozzle formation including at least one of the nozzle sets classified as the first nozzle group, at least one of the nozzle sets classified as the second nozzle group, and at least one of the nozzle sets classified as the third nozzle group so that the nozzle set classified as the first or third nozzle group is arranged adjacent to the nozzle set classified as the first nozzle group, and the nozzle set classified as the second or third nozzle group is arranged adjacent to the nozzle set classified as the second nozzle group; discharging the fluid onto the workpiece by using the sixth nozzle formation; and planarizing the discharged fluid by leaving the discharged fluid to stand on the workpiece.

In accordance with this discharge method, the distribution of the discharge quantity is computed and the nozzle groups are classified into first nozzle groups, second nozzle groups, and third nozzle groups. A sixth nozzle formation has the first nozzle groups adjacent to each other, or the third nozzle groups disposed adjacent to the first nozzle groups. The second end portion of one of the first nozzle groups and the first end portion of another of the first nozzle groups or the first end portion of the third nozzle groups are disposed adjacent to each other. In this case, the first nozzle groups have a discharge quantity at the second end portion that is greater than the discharge quantity of the first end portion. The third nozzle groups have a discharge quantity at the first end portion and a discharge quantity at the second end portion that are substantially the same. In other words, the location where the discharge quantity of the first nozzle groups is high, and the location where the discharge quantity is low or the location where the discharge quantity is substantially intermediate are disposed adjacent to each other. The same applies to the case in which the second nozzle groups are disposed adjacent to each other, or third nozzle groups are disposed adjacent to the second nozzle groups. The fluid coated in a high discharge quantity during coating flows to locations coated with a low discharge quantity or to locations in which the discharge quantity is intermediate. Therefore, the variance of the thickness can be reduced because the thickness of the coated fluid is averaged out.

In the discharge method described above, the computing of the distribution characteristic may include computing the distribution characteristic by a first-order approximation formula using a method of least squares and comparing the discharge quantities at the first end portion and the second end portion.

In accordance with this discharge method, a first-order approximation formula is computed in the distribution of the discharge quantity by using the method of least squares. Since the method of least squares can be used to compute with good precision a first-order approximation formula, a comparison can be made with good precision of the discharge quantity of the first end portion and the second end portion.

In the discharge method described above, the classifying of the nozzle sets may include comparing the discharge quantity discharged from the nozzles on a side of the first end portion and the discharge quantity discharged from the nozzles on a side of the second end portion.

In accordance with this discharge method, the sum of the discharge quantities discharged from the plurality of nozzles at the first end portion is computed. Similarly, the sum of the discharge quantities discharged from the plurality of nozzles at the second end portion is computed. The discharge quantity of the first end portion and the discharge quantity of the second end portion are compared. The computation is a simple method and can be completed in a short period of time. As a result, the classification can be carried out with good productivity.

The discharge method described above may further include symmetrically forming the first end portion and the second end portion of each of the nozzle sets, and reversing the first end portion and the second end portion of the nozzle set classified as the second nozzle group so that the nozzle set classified as the second nozzle group is used as the nozzle set of the first nozzle group, and reversing the first end portion and the second end portion of the nozzle set classified as the first nozzle group so that the nozzle set classified as the first nozzle group is used as the nozzle set of the second nozzle group In accordance with this discharge method, the first end portion and the second end portion are exchanged for one another to allow the first nozzle groups to be changed to the second nozzle groups. Similarly, the second nozzle groups can be changed to the first nozzle groups. Therefore, all of the droplet discharge heads in which the first nozzle groups and the second nozzle groups coexist can be designated as a first nozzle formation composed of the first nozzle groups. Similarly, all of the droplet discharge heads can be designated as a second nozzle formation composed of the second nozzle groups. As a result, the first nozzle formation or the second nozzle formation can be formed in a simple manner.

The discharge method described above may further include providing a head unit with a plurality of droplet discharge heads with each of the droplet discharge heads having the nozzle set, and replacing the head unit as a whole when a replacement of one of the droplet discharge heads is required.

In accordance with this discharge method, the head unit is exchanged each time the droplet discharge heads are exchanged. Therefore, the droplet discharge heads can be exchanged with good productivity in comparison with a method in which the droplet discharge heads are exchanged one at a time, because the droplet discharge heads can be exchanged a fewer number of times. As a result, maintenance can be performed with good productivity.

In the discharge as described above, the forming of the one of the first nozzle formation and the second nozzle may include combining a prescribed number of the nozzle sets so that a length of the one of the first nozzle formation and the second nozzle is equal to or greater than a width of an area in which the fluid is to be coated on the workpiece.

In accordance with this discharge method, a worker moves the workpiece in a single direction and the fluid is discharged from the nozzle groups, whereby an area intended for coating can be coated with the fluid. In this case, the discharge device is moved in the direction in which the nozzle groups are arrayed, and the fluid can be coated onto the workpiece without using a line feed. Therefore, the occurrence of streak patterns caused by line feeding the workpiece or the nozzle groups can be prevented. As a result, a film can be formed with good productivity.

In the discharge as described above, the providing of the head unit with the droplet discharge heads may include disposing the droplet discharge heads in a staggered fashion in the head unit.

In accordance with this discharge method, the droplet discharge heads are disposed in a staggered fashion. In other words, the droplet discharge heads are arrayed and formed into two rows in alternating fashion. The arrays are designated as a first array and a second array. The nozzles and the workpiece are moved relative to each other, and the fluid is coated in the diagonal direction or in the direction substantially orthogonal to the direction which the nozzles are arrayed. First, the droplet discharge heads of the first array discharge droplets and form a line. Next, the droplet discharge heads of the second array discharge droplets and form a line on the line formed by the droplet discharge heads of the first array. In this case, the time interval in which the droplet discharge heads of the first array and the droplet discharge heads of the second array discharge the fluid on the same line can be set to a short time. Therefore, the droplet discharge heads of the second array can coat the fluid before the fluid coated by the droplet discharge heads of the first array is solidified by drying or the like. The fluid coated by the droplet discharge heads of the first array mixes with the fluid coated by the droplet discharge heads of the second array. As a result, a film having low variance of the thickness can be obtained in locations where the film produced by the fluid coated by the droplet discharge heads of the first array is adjacent to the film produced by the fluid coated by the droplet discharge heads of the second array.

A continuous film formation may include discharging the fluid for forming the continuous film onto the workpiece using the discharge method according to the first aspect; and solidifying the fluid discharged onto the workpiece to form the continuous film.

In accordance with this continuous film formation method, locations in which the discharge quantity of the first nozzle groups is high and locations in which the discharge quantity is low are disposed adjacent to each other in the first nozzle formation. The fluid is discharged from the first nozzle groups, and the discharged fluid spreads on the workpiece. When locations having a high discharge quantity and locations having a low discharge quantity are adjacent to each other, the surface tension of the fluid has an effect whereby the fluid coated in a high discharge quantity flows to locations coated with a low discharge quantity. In the case that coating is carried out using the second nozzle formation, the fluid coated in a high discharge quantity similarly flows to locations coated with a low discharge quantity. Therefore, the variance of the thickness can be reduced because the thickness of the coated fluid is averaged out.

A continuous film formation may include discharging the fluid for forming the continuous film onto the workpiece using the discharge method according to the second aspect; and solidifying the fluid discharged onto the workpiece to form the continuous film.

In accordance with this continuous film formation method, locations in which the discharge quantity of the first nozzle groups is high and locations in which the discharge quantity is low, or locations in which the discharge quantity of the third nozzle groups are substantially intermediate are disposed adjacent to each other in the fourth nozzle formation. The fluid is discharged from the nozzles, and the discharged fluid spreads on the workpiece. When locations having a high discharge quantity and locations having a low discharge quantity, or locations having a discharge quantity that is substantially intermediate are adjacent to each other, the surface tension of the fluid has an effect whereby the fluid coated in a high discharge quantity flows to locations coated with a low discharge quantity or to locations in which the discharge quantity is substantially intermediate. In the case that coating is carried out using a fifth nozzle formation, the fluid coated in a high discharge quantity similarly flows to locations coated with a low discharge quantity, or to locations in which the discharge quantity is substantially intermediate. Therefore, the variance of the thickness can be reduced because the thickness of the coated fluid is averaged out.

A continuous film formation may include discharging the fluid for forming the continuous film onto the workpiece using the discharge method according to the third aspect; and solidifying the fluid discharged onto the workpiece to form the continuous film.

In accordance with this continuous film formation method, the third nozzle groups are disposed adjacent to each other in the third nozzle formation. In this case, the third nozzle groups have a discharge quantity at the first end portion and a discharge quantity at the second end portion that are substantially the same. In other words, nozzle groups in which the discharge quantity is substantially the same are provided. Therefore, since the thickness of the fluid thus coated is substantially the same, variance of the thickness can be reduced.

A continuous film formation may include discharging the fluid for forming the continuous film onto the workpiece using the discharge method according to the fourth aspect; and solidifying the fluid discharged onto the workpiece to form the continuous film.

In accordance with this continuous film formation method, in a sixth nozzle formation, the second end portion of one of the first nozzle groups and a first end portion of another of the first nozzle groups, or the first end portion of the third nozzle group are disposed adjacent to each other. The locations in which the discharge quantity of the first nozzle groups is high and the locations in which the discharge quantity is low, or the locations in which the discharge quantity is substantially intermediate are disposed adjacent to each other. The same applies to the case in which the second nozzle groups or the third nozzle groups are disposed adjacent to the second nozzle groups. The fluid coated in a high discharge quantity during coating flows to locations coated with a low discharge quantity or to locations in which the discharge quantity is substantially intermediate. Therefore, the variance of the thickness can be reduced because the thickness of the coated fluid is averaged out.

An alignment film formation method may include discharging the fluid including a liquid crystal alignment film formation composition onto a substrate as the workpiece using the discharge method according to the first aspect; and solidifying the liquid crystal alignment film formation composition discharged onto the substrate to form the alignment film.

In accordance with this alignment film formation method, locations in which the discharge quantity of the first nozzle groups is high and locations in which the discharge quantity is low are disposed adjacent to each other in the first nozzle formation. The liquid crystal alignment film formation composition is discharged from the first nozzle groups, and the discharged liquid crystal alignment film formation composition spreads on the workpiece. When locations having a high discharge quantity and locations having a low discharge quantity are adjacent to each other, the surface tension of the liquid crystal alignment film formation composition has an effect whereby the liquid crystal alignment film formation composition coated in a high discharge quantity flows to locations coated with a low discharge quantity. In the case that coating is carried out using the second nozzle formation, the liquid crystal alignment film formation composition coated in a high discharge quantity similarly flows to locations coated with a low discharge quantity. Therefore, the variance of the thickness can be reduced because the thickness of the coated liquid crystal alignment film formation composition is averaged out.

An alignment film formation method may include discharging the fluid including a liquid crystal alignment film formation composition onto a substrate as the workpiece using the discharge method according to the second aspect; and solidifying the liquid crystal alignment film formation composition discharged onto the substrate to form the alignment film.

In accordance with this alignment film formation method, locations in which the discharge quantity of the first nozzle groups is high and locations in which the discharge quantity is low, or locations in which the discharge quantity of the third nozzle group is substantially intermediate are disposed adjacent to each other in the fourth nozzle formation. The liquid crystal alignment film formation composition is discharged from the first nozzle groups, and the discharged liquid crystal alignment film formation composition spreads on the substrate. When locations having a high discharge quantity and locations having a low discharge quantity, or locations having a discharge quantity that is substantially intermediate are adjacent to each other, the surface tension of the liquid crystal alignment film formation composition has an effect whereby the liquid crystal alignment film formation composition coated in a high discharge quantity flows to locations coated with a low discharge quantity or to locations in which the discharge quantity is substantially intermediate. In the case that coating is carried out using a fifth nozzle formation, the liquid crystal alignment film formation composition coated in a high discharge quantity similarly flows to locations coated with a low discharge quantity, or to locations in which the discharge quantity is substantially intermediate. Therefore, the variance of the thickness can be reduced because the thickness of the coated liquid crystal alignment film formation composition is averaged out.

An alignment film formation method may include discharging the fluid including a liquid crystal alignment film formation composition onto a substrate as the workpiece using the discharge method according to the third aspect; and solidifying the liquid crystal alignment film formation composition discharged onto the substrate to form the alignment film.

In accordance with this alignment film formation method, the third nozzle groups are disposed adjacent to each other in the third nozzle formation. In this case, the third nozzle groups have a discharge quantity at the first end portion and a discharge quantity at the second end portion that are substantially the same. In other words, nozzle groups in which the discharge quantity is substantially the same are provided. Therefore, since the thickness of the liquid crystal alignment film formation composition thus coated is substantially the same, variance of the thickness can be reduced.

An alignment film formation method may include discharging the fluid including a liquid crystal alignment film formation composition onto a substrate as the workpiece using the discharge method according to the fourth aspect; and solidifying the liquid crystal alignment film formation composition discharged onto the substrate to form the alignment film.

In accordance with this alignment film formation method, in a sixth nozzle formation, the second end portion of one of the first nozzle groups and a first end portion of another of the first nozzle groups, or the first end portion of the third nozzle group are disposed adjacent to each other. The locations in which the discharge quantity of the first nozzle groups is high and the locations in which the discharge quantity is low, or the locations in which the discharge quantity is substantially intermediate are disposed adjacent to each other. The same applies to the case in which the second nozzle groups or the third nozzle groups are disposed adjacent to the second nozzle groups. The liquid crystal alignment film formation composition coated in a high discharge quantity during coating flows to locations coated with a low discharge quantity or to locations in which the discharge quantity is substantially intermediate. Therefore, the variance of the thickness can be reduced because the thickness of the coated liquid crystal alignment film formation composition is averaged out.

A method for forming a liquid crystal display device may include forming the alignment film on the substrate and an additional substrate using the alignment film formation method according to the first aspect; and disposing a liquid crystal between the substrate and the additional substrate.

In accordance with this method for forming a liquid crystal display device, locations in which the discharge quantity of the first nozzle groups is high and locations in which the discharge quantity is low are disposed adjacent to each other in the first nozzle formation. The liquid crystal alignment film formation composition is discharged from the nozzles, and the discharged liquid crystal alignment film formation composition spreads on the substrate. When locations having a high discharge quantity and locations having a low discharge quantity are adjacent to each other, the surface tension of the liquid crystal alignment film formation composition has an effect whereby the liquid crystal alignment film formation composition coated in a high discharge quantity flows to locations coated with a low discharge quantity. In the case that coating is carried out using the second nozzle formation, the liquid crystal alignment film formation composition coated in a high discharge quantity similarly flows to locations coated with a low discharge quantity. Therefore, the variance of the thickness can be reduced because the thickness of the coated liquid crystal alignment film formation composition is averaged out.

A method for forming a liquid crystal display device may include forming the alignment film on the substrate and an additional substrate using the alignment film formation method according to the second aspect; and disposing a liquid crystal between the substrate and the additional substrate.

In accordance with this method for forming a liquid crystal display device, locations in which the discharge quantity of the first nozzle groups is high and locations in which the discharge quantity is low, or locations in which the discharge quantity of the third nozzle group is substantially intermediate are disposed adjacent to each other in the fourth nozzle formation. The liquid crystal alignment film formation composition is discharged from the nozzles, and the discharged liquid crystal alignment film formation composition spreads on the substrate. When locations having a high discharge quantity and locations having a low discharge quantity, or locations having a discharge quantity that is substantially intermediate are adjacent to each other, the surface tension of the liquid crystal alignment film formation composition has an effect whereby the liquid crystal alignment film formation composition coated in a high discharge quantity flows to locations coated with a low discharge quantity or to locations in which the discharge quantity is substantially intermediate. In the case that coating is carried out using a fifth nozzle formation, the liquid crystal alignment film formation composition coated in a high discharge quantity similarly flows to locations coated with a low discharge quantity, or to locations in which the discharge quantity is substantially intermediate. Therefore, the variance of the thickness can be reduced because the thickness of the coated liquid crystal alignment film formation composition is averaged out.

A method for forming a liquid crystal display device may include forming the alignment film on the substrate and an additional substrate using the alignment film formation method according to the third aspect; and disposing a liquid crystal between the substrate and the additional substrate.

In accordance with this method for forming a liquid crystal display device, the third nozzle groups are disposed adjacent to each other in the third nozzle formation. In this case, the third nozzle groups have a discharge quantity at the first end portion and a discharge quantity at the second end portion that are substantially the same. In other words, nozzle groups in which the discharge quantity is substantially the same are provided. Therefore, since the thickness of the liquid crystal alignment film formation composition thus coated is substantially the same, variance of the thickness can be reduced.

A method for forming a liquid crystal display device may include forming the alignment film on the substrate and an additional substrate using the alignment film formation method according to the fourth aspect; and disposing a liquid crystal between the substrate and the additional substrate.

In accordance with this method for forming a liquid crystal display device, in a sixth nozzle formation, the second end portion of one of the first nozzle groups and a first end portion of another of the first nozzle groups, or the first end portion of the third nozzle group are disposed adjacent to each other. The locations in which the discharge quantity of the first nozzle groups is high and the locations in which the discharge quantity is low, or the locations in which the discharge quantity is substantially intermediate are disposed adjacent to each other. The same applies to the case in which the second nozzle groups are adjacent to each other, or the third nozzle groups are disposed adjacent to the second nozzle groups. The liquid crystal alignment film formation composition coated in a high discharge quantity during coating flows to locations coated with a low discharge quantity or to locations in which the discharge quantity is intermediate. Therefore, the variance of the thickness can be reduced because the thickness of the coated liquid crystal alignment film formation composition is averaged out.

A head unit according to the fifth aspect includes a plurality of nozzle sets with each of the nozzle sets including a plurality of nozzles arrayed between a first end portion and a second end portion of the nozzle set, and configured and arranged to discharge a fluid onto a workpiece. All of the nozzle sets in the head unit being classified as one of a first nozzle group having a distribution characteristic in which a discharge quantity of the nozzles at the second end portion is greater than a discharge quantity of the nozzles at the first end portion, and a second nozzle group having a distribution characteristic in which a discharge quantity of the nozzles at the first end portion is greater than a discharge quantity of the nozzles at the second end portion.

In accordance with this head unit, locations in which the discharge quantity of the first nozzle groups is high and locations in which the discharge quantity is low are disposed adjacent to each other in the first nozzle formation. The fluid is discharged from the nozzles and the discharged fluid spreads on the workpiece. When locations having a high discharge quantity and locations having a low discharge quantity are adjacent to each other, the surface tension of the fluid has an effect whereby the fluid coated in a high discharge quantity flows to locations coated with a low discharge quantity. In the case that coating is carried out using the second nozzle formation, the fluid coated in a high discharge quantity similarly flows to locations coated with a low discharge quantity. Therefore, the variance of the thickness can be reduced because the thickness of the coated fluid is averaged out.

A head unit according to the sixth aspect includes a plurality of nozzle sets with each of the nozzle sets including a plurality of nozzles arrayed between a first end portion and a second end portion of the nozzle set, and configured and arranged to discharge a fluid onto a workpiece. The nozzle sets in the head unit including one of a combination of at least one of the nozzle sets classified as a first nozzle group having a distribution characteristic in which a discharge quantity of the nozzles at the second end portion is greater than a discharge quantity of the nozzles at the first end portion, and at least one of the nozzle sets classified as a third nozzle group having a distribution characteristic in which a discharge quantity at the first end portion is generally the same as a discharge quantity at the second end portion, and a combination of at least one of the nozzle sets classified as a second nozzle group having a distribution characteristic in which a discharge quantity of the nozzles at the first end portion is greater than a discharge quantity of the nozzles at the second end portion, and at least one of the nozzle sets classified as the third nozzle group.

In accordance with this head unit, locations in which the discharge quantity of the first nozzle groups is high and locations in which the discharge quantity is low, or locations in which the discharge quantity of the third nozzle group is substantially intermediate are disposed adjacent to each other in the fourth nozzle formation. The fluid is discharged from the first nozzle groups, and the discharged fluid spreads on the workpiece. When locations having a high discharge quantity and locations having a low discharge quantity, or locations having a discharge quantity that is substantially intermediate are adjacent to each other, the surface tension of the fluid has an effect whereby the fluid coated in a high discharge quantity flows to locations coated with a low discharge quantity or to locations in which the discharge quantity is substantially intermediate. In the case that coating is carried out using a fifth nozzle formation, the fluid coated in a high discharge quantity similarly flows to locations coated with a low discharge quantity, or to locations in which the discharge quantity is substantially intermediate. Therefore, the variance of the thickness can be reduced because the thickness of the coated fluid is averaged out.

A head unit according to the seventh aspect includes a plurality of nozzle sets with each of the nozzle sets including a plurality of nozzles arrayed between a first end portion and a second end portion of the nozzle set, and configured and arranged to discharge a fluid onto a workpiece. All of the nozzle sets in the head unit being classified as a third nozzle group having a distribution characteristic in which a discharge quantity at the first end portion is generally the same as a discharge quantity at the second end portion.

In accordance with this head unit, the third nozzle groups are disposed adjacent to each other in the third nozzle formation. In this case, the third nozzle groups have a discharge quantity at the first end portion and a discharge quantity at the second end portion that are substantially the same. In other words, nozzle groups in which the discharge quantity is substantially the same are provided. Therefore, since the thickness of the fluid thus coated is substantially the same, variance of the thickness can be reduced.

A head unit according to the eighth aspect includes a plurality of nozzle sets with each of the nozzle sets including a plurality of nozzles arrayed between a first end portion and a second end portion of the nozzle set, and configured and arranged to discharge a fluid onto a workpiece. The nozzle sets in the head unit including at least one of the nozzle sets classified as a first nozzle group having a distribution characteristic in which a discharge quantity of the nozzles at the second end portion is greater than a discharge quantity of the nozzles at the first end portion, at least one of the nozzle sets classified as a second nozzle group having a distribution characteristic in which a discharge quantity of the nozzles at the first end portion is greater than a discharge quantity of the nozzles at the second end portion, and at least one of the nozzle sets classified as a third nozzle group having a distribution characteristic in which a discharge quantity at the first end portion is generally the same as a discharge quantity at the second end portion. The nozzle set classified as the first or third nozzle group being arranged adjacent to the nozzle set classified as the first nozzle group, and the nozzle set classified as the second or third nozzle group being arranged adjacent to the nozzle set classified as the second nozzle group.

In accordance with this head unit, in a sixth nozzle formation, the second end portion of one of the first nozzle groups and a first end portion of another of the first nozzle groups, or the first end portion of the third nozzle group are disposed adjacent to each other. The locations in which the discharge quantity of the first nozzle groups is high and the locations in which the discharge quantity is low, or the locations in which the discharge quantity is substantially intermediate are disposed adjacent to each other. The same applies to the case in which second nozzle groups or third nozzle groups are disposed adjacent to second nozzle groups. The fluid coated in a high discharge quantity during coating flows to locations coated with a low discharge quantity or to locations in which the discharge quantity is intermediate. Therefore, the variance of the thickness can be reduced because the thickness of the coated fluid is averaged out.

In the head unit according to the fifth to eighth aspects, each of the nozzle sets may have the first end portion and the second end portion symmetrically formed, and the first end portion and the second end portion of the nozzle set classified as the second nozzle group may be reversed so that the nozzle set classified as the second nozzle group is used as the nozzle set of the first nozzle group, and the first end portion and the second end portion of the nozzle set classified as the first nozzle group may be reversed so that the nozzle set classified as the first nozzle group is used as the nozzle set of the second nozzle group.

In accordance with this head unit, all of the droplet discharge heads in which the first nozzle groups and the second nozzle groups coexist can be designated as a first nozzle formation composed of the first nozzle groups. Similarly, all of the droplet discharge heads can be designated as a second nozzle formation composed the second nozzle groups. As a result, the first nozzle formation or the second nozzle formation can be formed in a simple manner.

In the head unit according to the fifth to eighth aspects, a plurality of droplet discharge heads may be disposed in a staggered fashion in the head unit with each of the droplet discharge heads being provided with the nozzle set.

In accordance with this head unit, the droplet discharge heads are arrayed and formed into two rows in alternating fashion. The arrays are designated as a first array and a second array. The time interval in which the droplet discharge heads of the first array and the droplet discharge heads of the second array discharge the fluid on the same line can be set to a short time. The fluid coated by the droplet discharge heads of the first array mixes with the fluid coated by the droplet discharge heads of the second array. As a result, a film having low variance of the thickness can be obtained in locations where the film produced by the fluid coated by the droplet discharge heads of the first array is adjacent to the film produced by the fluid coated by the droplet discharge heads of the second array.

A droplet discharge device may have the head unit according to the fifth aspect.

In accordance with this droplet discharge device, locations in which the discharge quantity of the first nozzle groups is high and locations in which the discharge quantity is low are disposed adjacent to each other in the first nozzle formation. The fluid is discharged from the nozzles, and the discharged fluid spreads on the workpiece. When locations having a high discharge quantity and locations having a low discharge quantity are adjacent to each other, the surface tension of the fluid has an effect whereby the fluid coated in a high discharge quantity flows to locations coated with a low discharge quantity. In the case that coating is carried out using the second nozzle formation, the fluid coated in a high discharge quantity similarly flows to locations coated with a low discharge quantity. Therefore, the variance of the thickness can be reduced because the thickness of the coated fluid is averaged out.

A droplet discharge device may have the head unit according to the sixth aspect.

In accordance with this droplet discharge device, locations in which the discharge quantity of the first nozzle groups is high and locations in which the discharge quantity is low, or locations in which the discharge quantity of the third nozzle group is substantially intermediate are disposed adjacent to each other in the fourth nozzle formation. The fluid is discharged from the nozzles, and the discharged fluid spreads on the workpiece. When locations having a high discharge quantity and locations having a low discharge quantity, or locations having a discharge quantity that is substantially intermediate are adjacent to each other, the surface tension of the fluid has an effect whereby the fluid coated in a high discharge quantity flows to locations coated with a low discharge quantity or to locations in which the discharge quantity is substantially intermediate. In the case that coating is carried out using a fifth nozzle formation, the fluid coated in a high discharge quantity similarly flows to locations coated with a low discharge quantity, or to locations in which the discharge quantity is substantially intermediate. Therefore, the variance of the thickness can be reduced because the thickness of the coated fluid is averaged out.

A droplet discharge device may have the head unit according to the seventh aspect.

In accordance with this droplet discharge device, the third nozzle groups are disposed adjacent to each other in the third nozzle formation. In this case, the third nozzle groups have a discharge quantity at the first end portion and a discharge quantity at the second end portion that are substantially the same. In other words, nozzle groups in which the discharge quantity is substantially the same are provided. Therefore, since the thickness of the fluid thus coated is substantially the same, variance of the thickness can be reduced.

A droplet discharge device may have the head unit according to the eighth aspect.

In accordance with this droplet discharge device, in a sixth nozzle formation, the second end portion of one of the first nozzle groups and a first end portion of another of the first nozzle groups, or the first end portion of the third nozzle group are disposed adjacent to each other. The locations in which the discharge quantity of the first nozzle groups is high and the locations in which the discharge quantity is low, or the locations in which the discharge quantity is substantially intermediate are disposed adjacent to each other. The same applies to the case in which the second nozzle groups are disposed adjacent to each other, or the third nozzle groups are disposed adjacent to the second nozzle groups. The fluid coated in a high discharge quantity during coating flows to locations coated with a low discharge quantity or to locations in which the discharge quantity is substantially intermediate. Therefore, the variance of the thickness can be reduced because the thickness of the coated fluid is averaged out.

An electronic apparatus may be provided with a display unit comprising a liquid crystal display device formed using the method for forming a liquid crystal display device as described above.

This electronic apparatus has a display unit provided with the liquid crystal display device. Since the liquid crystal display device is manufactured using the method described above, the device is formed having low variance in the film thickness. Therefore, an electronic apparatus can be obtained having a liquid crystal display device in which the variance in film thickness is low.

BRIEF DESCRIPTION OF THE DRAWINGS

Referring now to the attached drawings which form a part of this original disclosure:

FIG. 2 includes a plurality of diagrams (a) to (c), wherein (a) is a schematic plan view showing the carriage, (b) a schematic side surface view of the carriage, and (c) a partial schematic cross-sectional view for describing the structure of the droplet discharge head;

FIG. 4 is a flowchart showing the manufacturing step for forming a continuous film by discharging and coating droplets onto a substrate;

FIG. 5 is a diagram for describing a step for measuring the discharge quantity of the droplet discharge head;

FIG. 6 includes a plurality of graphs (a) to (c) showing the distribution characteristics of the discharge quantity;

FIG. 9 includes a plurality of diagrams (a) to (c) describing the discharge method according to a comparative example;

FIG. 13 includes a plurality of graphs (a) to (c) showing the distribution characteristics of the discharge quantity according to the fifth embodiment;

FIG. 14 includes a plurality of diagrams (a) to (c), wherein (a) is a schematic perspective view showing the configuration of a droplet discharge device according to the sixth embodiment; (b) is a schematic plan view showing the droplet discharge head, and (c) is a schematic side view showing the droplet discharge head;

FIG. 16 is a schematic exploded perspective view showing the structure of a liquid crystal display device according to an eighth embodiment; and FIG. 17 is a schematic perspective view showing a personal computer.

DETAILED DESCRIPTION OF EXEMPLARY EMBODIMENTS

Embodiments will be described below with reference to the diagrams. The size of the members in the diagrams is set so that the members are recognizable in the diagrammatic terms. Therefore, each member is diagramed with a different scaling.

First Embodiment

In the present embodiment, the droplet discharge device and characteristic examples will be described with reference to FIGS. 1 to 9 for the case in which a fluid is formed into droplets and discharged using the droplet discharge device.

Droplet Discharge Device

First, a droplet discharge device 1 for discharging and coating droplets onto a workpiece will be described with reference to FIGS. 1 to 3. There are various types of droplet discharge devices, but a device that uses an inkjet method is preferred. The inkjet method can be used to discharge very small droplets, and it therefore suitable for microfabrication.

Figure 1:
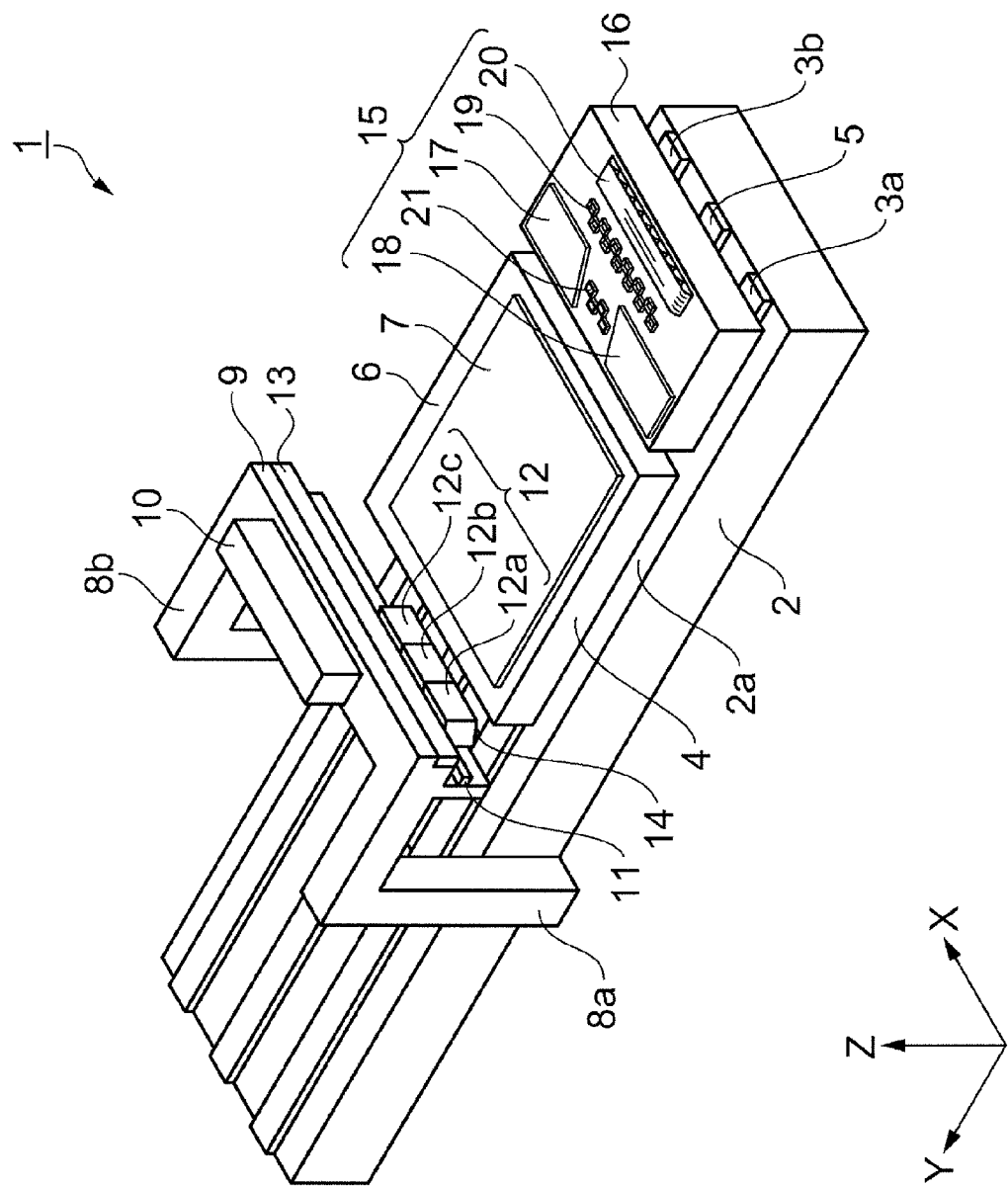
FIG. 1 is a schematic perspective view showing the configuration of a droplet discharge device according to the first embodiment.

FIG. 1 is a schematic perspective view showing the configuration of a droplet discharge device. A functional liquid is discharged by the droplet discharge device 1 and coated onto a workpiece. The droplet discharge device 1 is provided with a base 2 formed in the shape of a rectangular parallelepiped, as shown in FIG. 1. In the present embodiment, the Y-direction is the lengthwise direction of the base 2, and the X-direction is the direction orthogonal to the stated Y-axis direction.

A pair of guide rails 3a, 3b extending in the Y-axis direction is disposed in a protruding fashion on the upper surface 2a of the base 2 across the entire width in the Y-axis direction. A stage 4 as a table is mounted on the upper side of the base 2. The stage constitutes scanning means provided with a longitudinal motion mechanism (not shown) that corresponds to the guide rails 3a, 3b. The longitudinal motion mechanism of the stage 4 may, for example, be a screw-type longitudinal motion mechanism provided with a screw shaft (drive shaft) extending in the Y-axis direction along the guide rails 3a, 3b, and a ball nut that threads onto the screw shaft. The drive shaft is connected to a Y-axis motor (not shown) that receives predetermined pulse signals and rotates in forward and reverse in step units. When a drive signal corresponding to a predetermined number of steps is inputted to the Y-axis motor, the Y-axis motor rotates forward or in reverse, and the stage 4 moves forward or in reverse (Y-axis direction scanning) at a predetermined speed along the Y-axis direction by an amount commensurate with the number of steps.

A primary scan position detector 5 is disposed parallel to the guide rails 3a, 3b on the upper surface 2a of the base 2 so that the position of the stage 4 can be gauged.

A mounting surface 6 is formed on the upper surface of the stage 4, and a suction-type substrate chucking mechanism is provided to the mounting surface 6. When a substrate 7 as a workpiece is mounted on the mounting surface 6, the substrate 7 is positioned and secured in a predetermined position of the mounting surface 6 with the aid of the substrate chucking mechanism.

A pair of supports 8a, 8b is erectly disposed on the two sides of the base 2 in the X-axis direction, and a guide member 9 extending in the X-axis direction is provided to the pair of supports 8a, 8b in a suspended manner.

A storage tank 10 for storing a fluid to be discharged so that the fluid can be supplied is disposed on the upper side of the guide member 9. A guide rail 11 extending in the X-axis direction is disposed in a protruding fashion across the entire width in the X-axis direction on the lower surface of the guide member 9.

A carriage 12 is movably disposed along the substrate 11. The carriage 12 is composed of three carriages, i.e., a first carriage 12a to a third carriage 12c, and the carriages 12a to 12c are formed in the shape of a prism having a bottom surface that is substantially a parallelogram. The carriages 12a to 12c are provided with a longitudinal motion mechanism and can be separately moved. The longitudinal motion mechanism may be a screw-type longitudinal motion mechanism in the same manner as the longitudinal motion mechanism provided to the stage 4. The longitudinal motion mechanism is provided with a screw shaft (drive shaft), a ball nut that threads onto the screw shaft, and a stepping X-axis motor (not shown) for driving the ball nut. When a drive signal corresponding to a predetermined number steps is inputted to an X-axis motor, the X-axis motor rotates forward or in reverse, and the carriage 12 moves forward or in reverse (scanning in the X-axis direction) along the X-axis direction by an amount commensurate with the number of steps. A secondary scan position detector 13 is disposed between the guide member 9 and the carriage 12 so that the position of the carriages 12a to 12c can be gauged. A droplet discharge head 14 is disposed in a protruding manner on the lower surface (the surface on the stage 4 side) of the carriage 12.

A cleaning unit 15 is disposed on the upper side of the base 2 and near one side (right side in the diagram) of the stage 4. The cleaning unit 15 is composed of a maintenance stage 16 as well as a first flushing unit 17, a second flushing unit 18, a capping unit 19, a wiping unit 20, a weight measurement device 21, and other maintenance devices disposed on the maintenance stage 16.

The maintenance stage 16 is positioned on the guide rails 3a, 3b, and is provided with a longitudinal motion mechanism in a similar fashion as the stage 4. The maintenance stage 16 can be moved to and stopped in a desired location by detecting the position using the primary scan position detector 5 and moving the maintenance stage using the longitudinal motion mechanism. One unit among the first flushing unit 17, the second flushing unit 18, the capping unit 19, wiping unit 20, and the weight measurement device 21 is placed in a location facing the droplet discharge head 14 by moving the maintenance stage 16 along the guide rails 3a, 3b.

The first flushing unit 17 and the second flushing unit 18 are devices for receiving droplets discharged from the droplet discharge head 14 when the flow channels inside the droplet discharge head 14 are cleaned. Since the viscosity of the functional liquid is high when the functional liquid inside the droplet discharge head 14 volatilizes, it becomes more difficult for the droplet discharge head 14 to discharge functional liquid. In this case, the droplet discharge device 1 discharges droplets from the droplet discharge head 14 and washes the droplet discharge head in order to clear the functional liquid having higher viscosity from the droplet discharge head 14. The first flushing unit 17 and the second flushing unit 18 perform the function of receiving the droplets.

The capping unit 19 is a device having a function for capping the droplet discharge head 14 and a function from suctioning the functional liquid of the droplet discharge head 14. There are cases in which the droplets discharged from the droplet discharge head 14 are volatile. When the solvent of the functional liquid present in the droplet discharge head 14 volatilizes, the viscosity of the functional liquid changes and the nozzles may clog up as a result. The capping unit 19 prevents the nozzles from clogging by capping the droplet discharge head 14.

When solid matter becomes mixed inside the droplet discharge head 14 and droplets can no longer be discharged, the solid matter and functional liquid inside the droplet discharge head 14 is suctioned away and removed. The configuration is designed to resolve clogged nozzles.

The wiping unit 20 is a device for wiping a nozzle plate in which the nozzles of the droplet discharge head 14 are provided. The nozzle plate is a member disposed on the surface of droplet discharge head 14 on the side facing the substrate 7. When the droplets are deposited on the nozzle plate, the droplets may become deposited in unintended locations on the substrate 7 when the droplets deposited on the nozzle plate come into contact with the substrate 7.

When the droplets are deposited in the vicinity of the nozzles, the droplets deposited on the nozzle plate come into contact with discharged droplets, and the trajectory of the discharged droplets is deflected. Also, the coating location may differ from the intended coating location. The wiping unit 20 wipes the nozzle plate to thereby prevent droplets from being deposited in unintended locations on the substrate 7.

The weight measurement device 21 is provided with four electronic scales in a staggered fashion, and each electronic scale is provided with a receptacle. Droplets are discharged from the droplet discharge head 14 into the receptacles and the electronic scales weigh of the droplets. The receptacles are provided with a spongy absorber configured so that the discharged droplets do not bounce and escape the receptacles. The electronic scales weigh the receptacles before and after the droplet discharge head 14 discharges droplets. The weight measurement device 21 can weigh the discharged droplets by computing the difference in weights of the receptacles before and after discharge.

The first flushing unit 17 and the second flushing unit 18 are disposed on the two sides of the weight measurement device 21. Another droplet discharge head 14 is placed in a location facing the first flushing unit 17 and the second flushing unit 18 to allow droplets to be discharged while the discharge quantity discharged from some of the droplet discharge heads 14 is being weighed.

FIG. 2(a) is a schematic plan view showing the carriage. Four droplet discharge heads 14 are provided to a single carriage 12 in a staggered fashion, as shown in FIG. 2(a). The droplet discharge heads 14 are designated as first droplet discharge head 14a to fourth droplet discharge head 14d in sequence from the left side of the droplet discharge head 14. The end portion on the left side of the droplet discharge head 14 is referred to as the first end portion 14e, and the end portion on the right side of a droplet discharge head 14 is referred to as the second end portion 14f. A nozzle plate 25 is disposed on the surface of the droplet discharge heads 14, and a plurality of nozzles 26 of a nozzle set is formed in the nozzle plate 25. The number of nozzles 26 in the nozzle set can be set in accordance with the size of the substrate 7 and the pattern to be formed by discharge. In the present embodiment, a single row of nozzles 26 is formed on a single nozzle plate 25, and 15 nozzles 26 are aligned and formed in a single row of the nozzle set from the first end portion 14e to the second end portion 14f.

The nozzles 26 of the nozzle set formed on the second droplet discharge head 14b and the fourth droplet discharge head 14d are arrayed on the same line, and this array is designated as a first array 26a. Similarly, the nozzles 26 of the nozzle sets formed on the first droplet discharge head 14a and the third droplet discharge head 14c are arrayed on the same line, and this array is designated as a second array 26b. In this case, the first array 26a and the second array 26b are disposed in proximate locations. When the substrate 7 proceeds in the Y-axis direction, droplets are discharged from the nozzles 26 of the first array 26a, after which droplets are discharged from the nozzles 26 of the second array 26b, whereby droplets can be coated on the same straight line. The droplets discharged from the nozzles 26 of the second array 26b land before the drying of the droplets discharged from the nozzles 26 of the first array 26a. The droplets discharged from the nozzles 26 of the first array 26a are coated so as to mix with droplets discharged from the nozzles 26 of the second array 26b.

FIG. 2(b) is a schematic side surface view showing the carriage, and is a view of the carriage shown in FIG. 2(a) as seen from the Y-axis direction. The carriage 12 is provided with a base plate 27, as shown in FIG. 2(b). A movement mechanism 28 is disposed on the upper side of the base plate 27 and accommodates a mechanism for the carriage 12 to move along a guide rail 11.

A drive circuit board 30 is placed on the lower side of the base plate 27 via a supporting portion 29. A head drive circuit 31 is disposed on the lower side of the drive circuit board 30. A head mounting plate 33 is placed on the base plate 27 via a supporting portion 32, and the droplet discharge heads 14 are disposed on the lower surface of the head mounting plate 33. A head unit 34 is composed of the head mounting plate 33, the droplet discharge heads 14, and other components. The head drive circuit 31 and the droplet discharge heads 14 are connected by a cable (not shown) so that drive signals outputted by the head drive circuit 31 are inputted to the droplet discharge heads 14.

A supply device 35 is disposed on the lower side of the base plate 27. A tube (not shown) connects the storage tank 10 and the supply device 35, as well as the supply device 35 and the droplet discharge head 14. The functional liquid supplied from the storage tank 10 passes through the tube and is supplied from the supply device 35 to the droplet discharge heads 14.

FIG. 2(c) is a partial schematic cross-sectional view for describing the structure of the droplet discharge head. The droplet discharge heads 14 are provided with a nozzle plate 25, and the nozzles 26 are formed in the nozzle plate 25, as shown in FIG. 2(c). A cavity 36 in communication with the nozzles 26 is formed in a position corresponding to each of the nozzles 26 in the upper side of the nozzle plate 25. A functional liquid 37 as a fluid stored in the storage tank 10 is supplied to the cavity 36 of each of the droplet discharge heads 14.

Provided to the upper side of the cavity 36 are a vibration plate 38 that vibrates in the vertical direction (Z direction) to expand and contract the volume inside the cavity 36, and a piezoelement 39 that expands and contracts to cause the vibration plate 38 to vibrate. The piezoelement 39 expands and contracts in the vertical direction, applies pressure to the vibration plate 38, and vibrates. The vibration plate 38 expands and contracts the volume inside the cavity 36 and applies pressure to the cavity 36. The pressure inside the cavity 36 is thereby made to fluctuate, and the functional liquid 37 supplied inside the cavity 36 passes through the nozzles 26 and is discharged.

When the droplet discharge head 14 receives a nozzle drive signal for controlling and driving the piezoelement 39, the piezoelement 39 expands and contracts, and the vibration plate 38 expands and contracts the volume inside the cavity 36. As a result, the functional liquid 37 is discharged as a droplet 40 from the nozzle 26 of the droplet discharge head 14 in an amount commensurate to the contracted volume.

Figure 3:
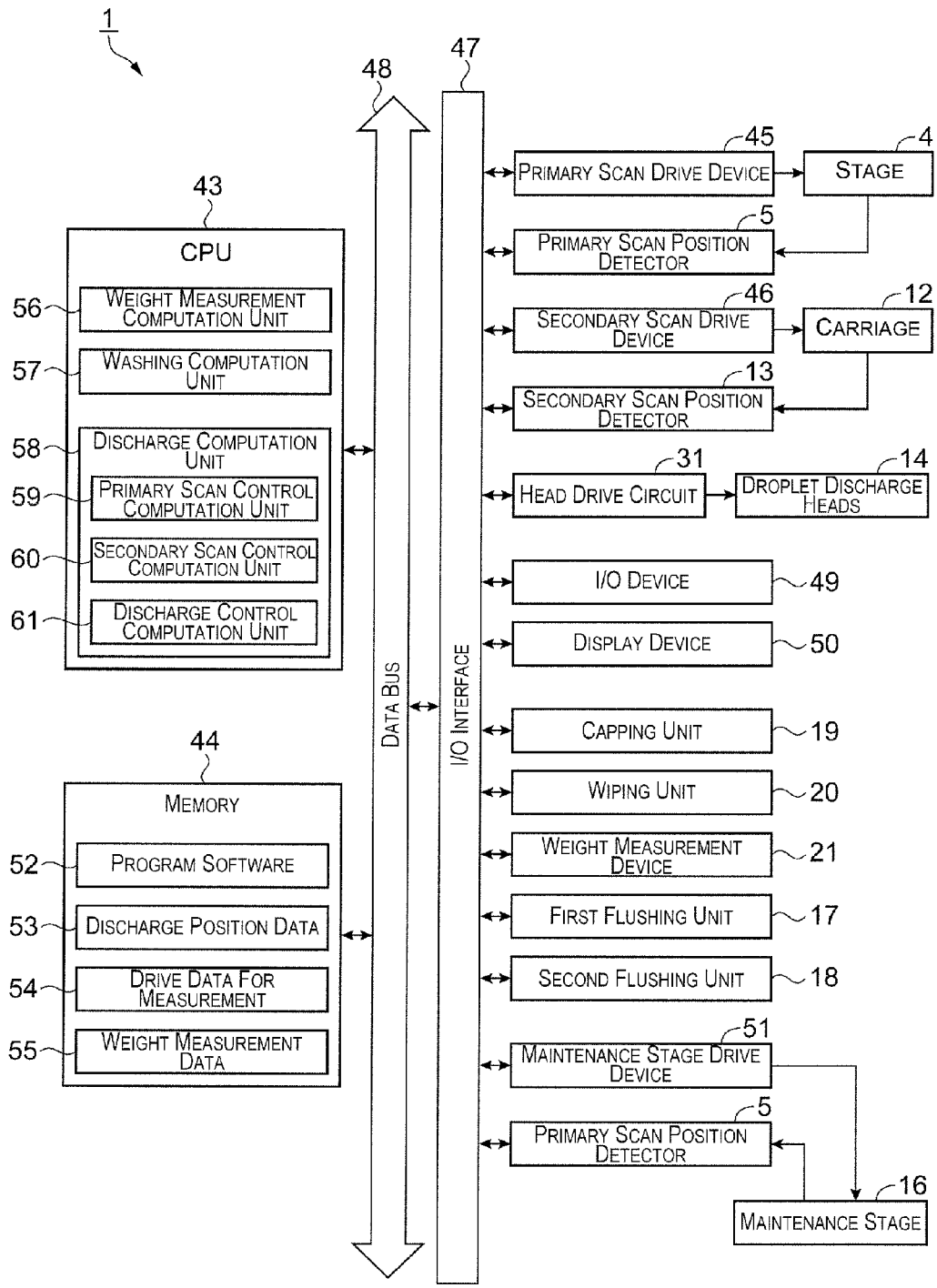
FIG. 3 is an electrical control block diagram of a droplet discharge device.
Figure 7:
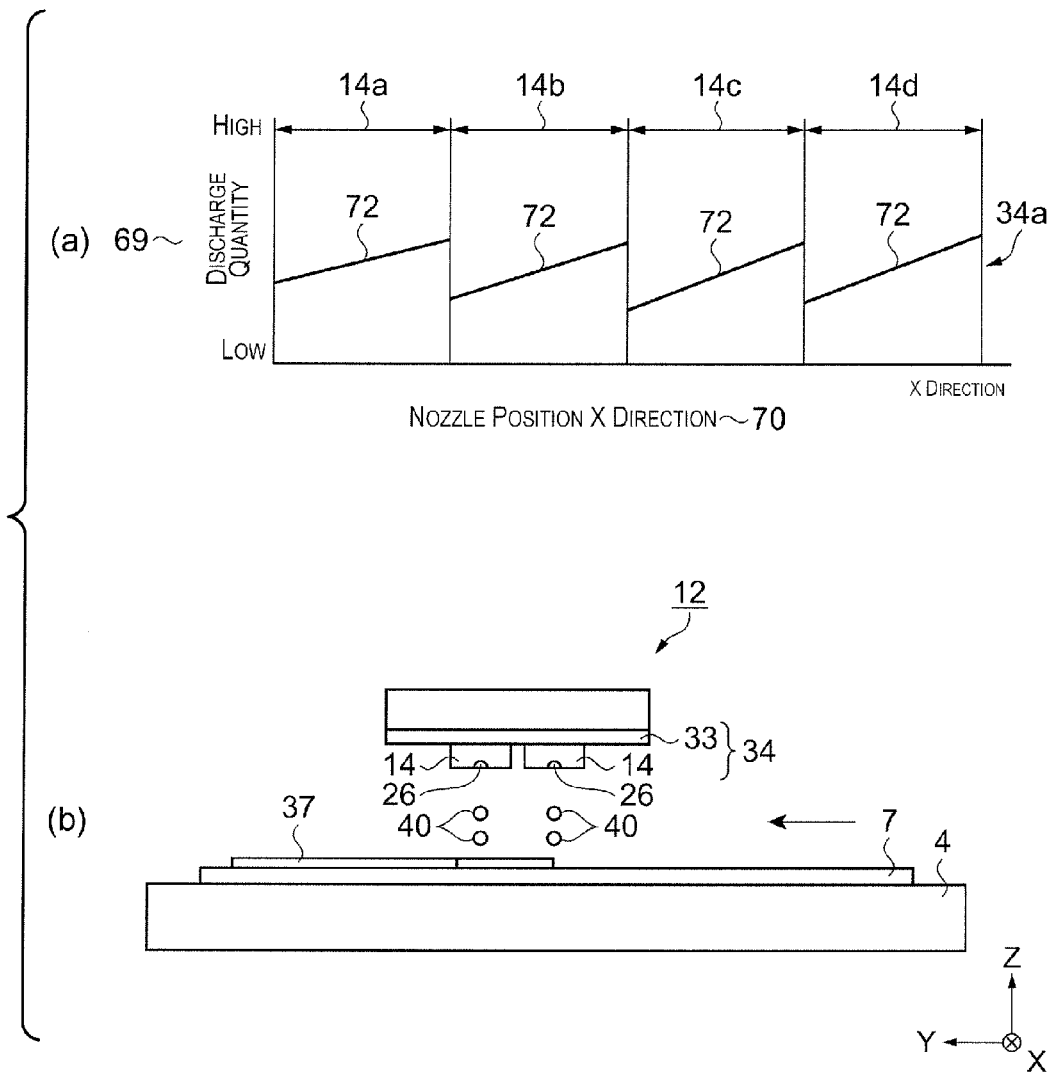
FIG. 7 includes a pair of diagrams (a) and (b), wherein (a) is a diagram describing the nozzle formation step, and (b) is a diagram describing the discharge step.
Figure 8:
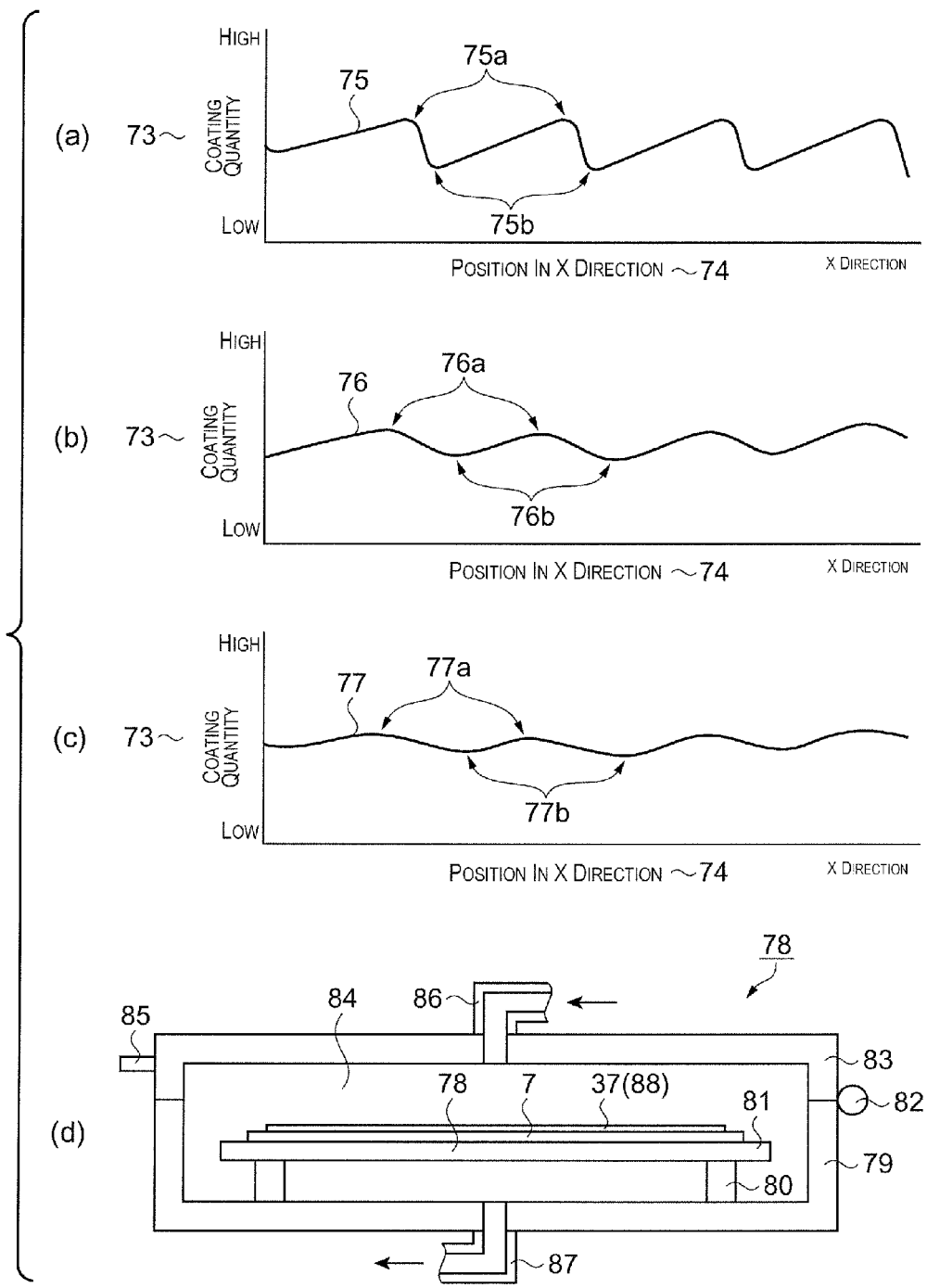
FIG. 8 includes a plurality of diagrams (a) to (d), wherein (a) to (c) are schematic diagrams showing the distribution of the coated quantity of the functional liquid coated onto the substrate, and (d) is a diagram showing a drying device.

FIG. 3 is an electrical control block diagram of a droplet discharge device. In FIG. 3, the droplet discharge device 1 has a CPU (Computation Processing Unit) 43 for performing various computations as a processor, and a memory 44 for storing a variety of information.

The head drive circuit 31 for driving a primary scan drive device 45, a secondary scan drive device 46, the primary scan position detector 5, the secondary scan position detector 13, and the droplet discharge head 14 is connected to the CPU 43 via an I/O interface 47 and a data bus 48. Also connected to the CPU 43 via the I/O interface 47 and the data bus 48 are an input device 49, a display device 50, the weight measurement device 21, the first flushing unit 17, the second flushing unit 18, the capping unit 19, and the wiping unit 20. Similarly, in the cleaning unit 15, a maintenance stage drive device 51 for driving the maintenance stage 16, and the primary scan position detector 5 for detecting the position of the maintenance stage 16 are also connected to the CPU 43 via the I/O interface 47 and the data bus 48.

The primary scan drive device 45 is a device for controlling the movement of the stage 4, and the secondary scan drive device 46 is a device for controlling the movement of the carriage 12. The primary scan position detector 5 senses the position of the stage 4, and the primary scan drive device 45 controls the movement of the stage 4, whereby the stage 4 can be moved to and stopped in a desired position. Similarly, the secondary scan position detector 13 senses the position of the carriage 12, and the secondary scan drive device 46 controls the movement of the carriage 12, whereby the carriage 12 can be moved to and stopped in a desired position.

The input device 49 is a device for inputting a variety of fabrication conditions to be used for discharging droplets 40, and may, for example, be a device for receiving from an external device (not shown) coordinates at which the droplets 40 will be discharged onto the substrate 7, and providing the coordinates as input. The display device 50 is a device for displaying the fabrication conditions and the work situation. An operator performs operations using the input device 49 on the basis of information displayed on the display device 50.

The weight measurement device 21 is provided with an electronic scale and a receptacle, and is a device for weighing the droplets 40 discharged by the droplet discharge heads 14 and weighing the receptacle for receiving the droplets 40. The weight measurement device 21 weighs the receptacle before and after the droplets 40 are discharged, and transmits the measured value to the CPU 43.

The maintenance stage drive device 51 is a device for selecting a single device from the first flushing unit 17, the second flushing unit 18, the capping unit 19, the wiping unit 20, and the weight measurement device 21, and moving the maintenance stage 16 so as to position the stage in a location facing the droplet discharge heads 14. The primary scan position detector 5 detects the position of the maintenance stage 16, and the maintenance stage drive device 51 then moves the maintenance stage 16, whereby a desired device or unit can be reliably moved to a location facing the droplet discharge heads 14.

The memory 44 may be RAM, ROM, or other semiconductor memory, or a hard disk, CD-ROM, or another external storage device. In terms of function, a storage area is established for storing program software 52 in which are recorded the control procedures of the actions in the droplet discharge device 1. A storage area is also established for storing discharge position data 53, which is coordinate data of the discharge position on the substrate 7.

A storage area is set up for storing measurement drive data 54 for driving the piezoelement 39 when the droplets 40 discharged from the nozzles are weighed. Also, a storage area is set up for storing weight measurement data 55 measured by the weighing device 21. Also established are a storage area for storing the primary scan movement distance for moving the substrate 7 in the primary scan direction (Y direction) and the secondary scan movement distance for moving the carriage 12 in the secondary scan direction (X direction); a storage area that functions as a work area, a temporary file area, or the like for the CPU 43; and other storage areas.

The CPU 43 performs control for forming the functional fluid into droplets 40 and discharging the droplets in predetermined locations on the surface of the substrate 7 in accordance with the program software 52 stored in the memory 44. As a specific function implementation unit, the CPU has a weight measurement computation unit 56 that performs computations for implementing weight measurement. The CPU furthermore has a washing computation unit 57 that computes the timing for washing the droplet discharge heads 14.

Additionally, the CPU has a discharge computation unit 58 or the like that performs computations for discharging droplets 40 from the droplet discharge heads 14. Divided into finer units, the discharge computation unit 58 has a primary scan control computation unit 59 that performs control computations for scanning and moving the substrate 7 at a predetermined speed in the primary scan direction (Y direction). The discharge computation unit 58 additionally has a secondary scan control computation unit 60 that performs control computations for moving the droplet discharge heads 14 over a predetermined secondary scan movement distance in the secondary scan direction (X direction). The discharge computation unit 58 furthermore has a variety of functional computation units such as a discharge control computation unit 61 or the like for performing computations for controlling which nozzle among the plurality of nozzles in the droplet discharge heads 14 is to be actuated to discharge the functional fluid.

Discharge Method

Described next with reference to FIGS. 4 to 9 is the discharge method for forming a continuous film by discharging and coating functional liquid onto the substrate 7 by using the droplet discharge device 1 described above. FIG. 4 is flowchart showing the manufacturing step for forming a continuous film by discharging and coating droplets onto a substrate. FIGS. 5 to 9 are diagrams for describing the discharge method in which the droplet discharge device is used.

Step S1 corresponds to a distribution computation step in which the discharge quantity is measured for each nozzle of the droplet discharge heads. Step S1 is also a step for computing the distribution characteristic of the discharge quantity in a nozzle row. Next, the process proceeds to step S2. Step S2 corresponds to a classification step and is a step for classifying the droplet discharge heads on the basis of the distribution of the discharge quantity among the nozzle rows. Next, the process proceeds to step S3. Step S3 corresponds to a nozzle formation step and is a step for forming head units using the classified droplet discharge heads. Next, the process proceeds to step S4. Step S4 corresponds to a head arrangement step, and is a step for arranging the head units in the droplet discharge device. Next the process proceeds to step S5. Step S5 corresponds to a discharge step, and is a step for discharging droplets onto a substrate. Next, the process proceeds to step S6. Step S6 corresponds to a planarization step, and is a step for waiting until the functional liquid coated in step S5 has become smooth (planarized). Next, the process proceeds to step S7. Step S7 corresponds to a solidification step, and is a step for solidifying the coated functional liquid by drying. The manufacturing step for forming a continuous film by discharging and coating the functional liquid onto a substrate is completed in the manner described above.

Next, in correspondence with the steps described in FIG. 4, the manufacturing method for discharging functional liquid from the droplet discharge head to form a continuous film having low variance of thickness will be described in detail with reference to FIGS. 5 to 8. FIGS. 5 and 6 are diagrams corresponding to step S1, and FIG. 5 is a diagram for describing the step for measuring the discharge quantity of the droplet discharge head. FIG. 6 is a graph showing the distribution of the discharge quantity. The weight measurement device 21 is provided with an electronic scale 64, and a receptacle 65 is disposed on the upper side of the electronic scale 64, as shown in FIG. 5. An absorber 66 is disposed in the upper portion of the receptacle 65, and the droplets 40 discharged from the droplet discharge heads 14 pass through the absorber 66, after which the functional liquid 37 pools inside the receptacle 65. Four droplet discharge heads 14 are disposed in the carriage 12, and four weight measurement devices 21 are disposed in the maintenance stage 16. A single droplet discharge head 14 and weight measurement device 21 are shown in FIG. 5 in order to simplify the description and facilitate understanding.

By operating the carriage 12 and the maintenance stage 16, the discharge computation unit 58 moves the droplet discharge head 14 and the receptacle 65 to a location in which the droplet discharge head 14 faces the receptacle 65. The electronic scale 64 weighs the receptacle 65. Next, a predetermined number of discharges is performed from a single nozzle 26. The number of discharges corresponding to a discharge quantity that can be measured by the electronic scale 64 with good precision can be set; 100 discharges is used in the present embodiment.

Next, the electronic scale 64 weighs the receptacle 65. The difference between the weight of the receptacle 65 prior to discharge and the weight of the receptacle 65 after discharge is computed, and the computed value is then divided by the number of discharges, whereby the discharge quantity per discharge is calculated. Discharge and computation of droplets 40 is sequentially carried out for all the nozzles 26 of the droplet discharge heads 14. Since four weight measurement devices 21 are provided to a single maintenance stage 16, the discharge quantity of each nozzle 26 of the four droplet discharge heads 14 is measured simultaneously and computed.

FIGS. 6(a) to 6(c) show examples of the distribution of the discharge quantity. In FIGS. 6(a) to 6(c), the vertical axis shows the discharge quantity 69, and the discharge quantity is greater on the upper side than on the lower side. The horizontal axis shows the nozzle positions 70 using the nozzle number. The nozzle number is assigned from the first end portion 14e toward the second end portion 14f. The measured values 71 of the discharge quantity 69 in relation to the first to fifteenth nozzle positions 70 are plotted in FIG. 6(a). A weight measurement computation unit 56 computes a first-order approximation formula in relation to the measured values 71. The computation uses the method of least squares. The line produced by the computed first-order approximation formula is the approximation line 72.

In the first to fourth nozzle positions 70, the discharge quantity is greater for the first nozzle position 70. In the fifth to fifteenth nozzle positions 70, the discharge quantity is greater for the fifteenth nozzle position 70. Therefore, the approximation line 72 shows a straight line upward to the right.

FIG. 6(b) shows an example in which the distribution of the discharge quantity 69 is substantially symmetrical. In this case, the line produced by the computed first-order approximation formula is the approximation line 72. Since the distribution of the discharge quantity 69 is substantially symmetrical, the approximation line 72 is a straight line that is substantially parallel to the horizontal axis.

FIG. 6(c) shows an example of a distribution in which the discharge quantity 69 is greater on the left side. In the first to eleventh nozzle positions 70, the discharge quantity is greater for the first nozzle position 70. In the twelfth to fifteenth nozzle positions 70, the discharge quantity is greater on for fifteenth nozzle position 70. Therefore, the approximation line 72 shows a straight line upward to the left.

The types of distribution shown in FIG. 6(a) to 6(c) are classified into first to third nozzle groups. The droplet discharge head 14 of the first nozzle group in the distribution of the discharge quantity 69 is designated as a droplet discharge head 14 in which the discharge quantity 69 of the second end portion 14f is greater than those of the first end portion 14e. The droplet discharge head 14 of the distribution in FIG. 6(a) corresponds to the first nozzle group. The droplet discharge heads 14 of the second nozzle group are designated as droplet discharge heads 14 in which the discharge quantity 69 of the first end portion 14e is greater than those of the second end portion 14f. The droplet discharge head 14 of the distribution in FIG. 6(c) corresponds to the second nozzle group. The droplet discharge heads 14 of the third nozzle group are designated as droplet discharge heads 14 in which the discharge quantity 69 is substantially the same at the second end portion 14f and the first end portion 14e. The droplet discharge head 14 of the distribution in FIG. 6(b) corresponds to the third nozzle group.

In step S2, the droplet discharge heads 14 are classified into first to third nozzle groups. In this case, classification is carried out using the slope of the approximation line 72. When the first to third nozzle groups are classified, the threshold of the slope of the approximation line 72 is determined in advance. The threshold for classifying the first nozzle group and the third nozzle group is set as the first threshold, and the threshold for classifying the second nozzle group and the third nozzle group is set as the second threshold. The slope of the approximation line 72 of the droplet discharge heads 14 is compared with the threshold, and droplet discharge heads 14 in which the slope of the approximation line 72 is greater than the first threshold is classified as the first nozzle group. Similarly, the droplet discharge heads 14 in which the slope of the approximation line 72 is less than the second threshold are classified as the second nozzle group, and the droplet discharge heads 14 in which the slope of the approximation line 72 is between the first threshold and the second threshold are classified as the third nozzle group.

FIG. 7(a) is a diagram corresponding to step S3, and is a diagram describing the nozzle formation step. A worker aligns the droplet discharge heads 14 belonging to the first nozzle group and arranges them on the head mounting plate 33 shown in FIG. 2(b). The head unit 34 composed of the droplet discharge heads 14 belonging to the first nozzle group is designated as the first nozzle formation 34a. In FIG. 7(a), the vertical axis shows the discharge quantity 69, and the discharge quantity is greater on the upper side than the lower side. The horizontal axis shows the nozzle positions 70, the right side being the X direction. The approximation line 72 of the first droplet discharge head 14a to the fourth droplet discharge head 14d is indicated by a straight light upward to the right. In this case, the approximation line 72 shows that a difference in discharge quantity 69 is produced between the first droplet discharge head 14a and the second droplet discharge head 14b. Similarly, the approximation line 72 shows that a difference in discharge quantity 69 is produced between the second droplet discharge head 14b and the third droplet discharge head 14c, and between the third droplet discharge head 14c and the fourth droplet discharge head 14d. In other words, the approximation line 72 has a serrated shape.

In step S4, the head mounting plate 33 on which the droplet discharge heads 14 are disposed are mounted by the worker on the carriage 12, as shown in FIG. 2(b). A tube for supplying the functional liquid 37, and a cable for transmitting drive signals that drive the piezoelement 39, are connected to the droplet discharge heads 14.

FIG. 7(b) is a diagram that corresponds to step S5 and describes the discharge step. The discharge computation unit 58 moves the droplet discharge heads 14 to a location facing the substrate 7 by moving the carriage 12 and the stage 4 relative to each other, as shown in FIG. 7(b). Next, the discharge computation unit 58 causes droplets 40 to be discharged from the droplet discharge head 14 while the stage 4 is scanned, and functional liquid 37 is coated onto the substrate 7.

FIGS. 8(a) to 8(c) correspond to step S6 and are diagrams showing the distribution of the coated quantity of the functional liquid 37 coated onto the substrate 7. The vertical axis shows the coated quantity 73, and the coated quantity 73 increases from the lower side to the upper side. The horizontal axis shows the position 74 in the X direction of the substrate. The distribution curves 75 to 77 show the distribution of the coated quantity 73 in relation to the position 74 in the X direction.

The distribution curve 75 in FIG. 8(a) shows the distribution immediately after the functional liquid 37 has been coated onto the substrate 7. The distribution curve 76 in FIG. 8(b) shows the distribution when some time has elapsed after the functional liquid 37 has been coated onto the substrate 7. The distribution curve 77 in FIG. 8(c) shows the distribution when more time has elapsed.

Convexities 75a and concavities 75b are formed in the distribution curve 75, as shown in FIG. 8(a). Since the convexities 75a and concavities 75b are adjacent to each other, the effect of gravity and surface tension applied to the functional liquid 37 causes the functional liquid 37 on the convexities 75a to flow into the concavities 75b.

As a result, in the distribution curve 76, the difference between the coated quantity 73 in convexities 76a and concavities 76b is reduced, as shown in FIG. 8(b). The difference between the coated quantity 73 in convexities 77a and concavities 77b is reduced in the distribution curve 77 with the passage of time, as shown in FIG. 8(c).

The FIG. 8(d) is a diagram that corresponds to step S7, and is a schematic diagram showing a drying device. The worker arranges a substrate 7 inside the drying device 78, as shown in FIG. 8(d). The drying device 78 is provided with a rectangular main unit 79 having an open upper side. A mount 81 is disposed in the main unit 79 via a support unit 80, and the substrate 7 is disposed on the upper surface of the mount 81. A lid 83 is disposed on the upper side of the main unit 79 and can be opened and closed via a hinge 82. A chamber 84 is composed of the main unit 79 and the lid 83. A knob 85 is formed on the lid 83, and the worker can open and close the lid 83 using the knob 85.

A supply port 86 is formed in the lid 83, and the supply port 86 is connected to a dry-gas supply device (not shown). An exhaust port 87 is formed in the main unit 79. The dry-gas supply device supplies a gas whose temperature, humidity, and pressure has been adjusted to the chamber 84 via the supply port 86. The gas thus supplied dries the substrate 7 inside the chamber 84 and is then exhausted from the exhaust port 87. The functional liquid 37 coated onto the substrate 7 is solidified by drying inside the chamber 84, and a continuous film 88 is formed. The manufacturing step for forming the continuous film 88 by discharging and coating the functional liquid onto the substrate is completed in the step described above.

Comparative Example

Next, changes in the coated quantity 73 will be described for the case in which the droplet discharge heads 14 of the first nozzle group and the second nozzle group are disposed in alternating fashion and the functional liquid 37 is coated. FIG. 9(a) shows an example in which the droplet discharge heads 14 of the first nozzle group are disposed in the first droplet discharge head 14a and third droplet discharge head 14c, and the droplet discharge heads 14 of the second nozzle group are disposed at the positions of the second droplet discharge head 14b and the fourth droplet discharge head 14d.

The droplet discharge heads 14 are arranged so that the discharge quantity 69 is increased in the location where the first droplet discharge head 14a and the second droplet discharge head 14b are adjacent to each other and in the location where the third droplet discharge head 14c and the fourth droplet discharge head 14d are adjacent to each other. The droplet discharge heads 14 are arranged so that the discharge quantity 69 is reduced in the location where the second droplet discharge head 14b and the third droplet discharge head 14c are adjacent to each other.

The distribution curve 89 in FIG. 9(b) shows the distribution of the coated quantity 73 when the functional liquid 37 is coated onto the substrate 7 in step S5 using the droplet discharge heads 14 arranged in this manner. The distribution curve 90 in FIG. 9(c) shows the distribution after some time has elapsed after the functional liquid 37 has been applied.

Convexities 89a and concavities 89b are formed in the distribution curve 89, as shown in FIG. 9(b). Since the convexities 89a and concavities 89b are located at a distance from each other, the effect of gravity and surface tension applied to the functional liquid 37 is not liable to affect the convexities 89a and concavities 89b. As a result, the distribution curve 90 is not likely to become smooth even after some time has elapsed after the functional liquid 37 has been coated, as shown in FIG. 9(c).

The present embodiment as described above has the following effects.

(1) In accordance with the present embodiment, the distribution of the discharge quantity is computed and classified into first to third nozzle groups. The head unit 34 is formed in which some droplet discharge heads 14 of the first nozzle group are disposed adjacent to other droplet discharge heads 14 of the first nozzle group, and the head unit 34 is designated as the first nozzle formation 34a. In this case, a location in which the discharge quantity of the first nozzle group is high is disposed adjacent to a location in which the discharge quantity is low. Next, the functional liquid 37 is discharged from the nozzles 26 of the first nozzle formation 34a. The discharged functional liquid 37 spreads on the substrate 7. When a location having a high discharge quantity is adjacent to a location having a low discharge quantity, the surface tension of the functional liquid 37 has an effect whereby the functional liquid 37 coated in a high discharge quantity flows to locations coated with a low discharge quantity. Therefore, the variance of the thickness can be reduced because the thickness of the coated functional liquid 37 is averaged out.

(2) In accordance with the present embodiment, a first-order approximation formula is computed in the distribution of the discharge quantity in step S1 using the method of least squares. Since the method of least squares can be used to compute with good precision a first-order approximation formula, a comparison can be made with good precision of the discharge quantity of the first end portion 14e and the second end portion 14f.

(3) In accordance with the present embodiment, the head unit 34 is exchanged each time the droplet discharge heads 14 are exchanged. Therefore, the droplet discharge heads 14 can be exchanged with better productivity in comparison with a method in which the droplet discharge heads 14 are exchanged one at a time, because the droplet discharge heads 14 can be exchanged a fewer number of times. As a result, maintenance can be performed with good productivity.

Second Embodiment

Figure 10:
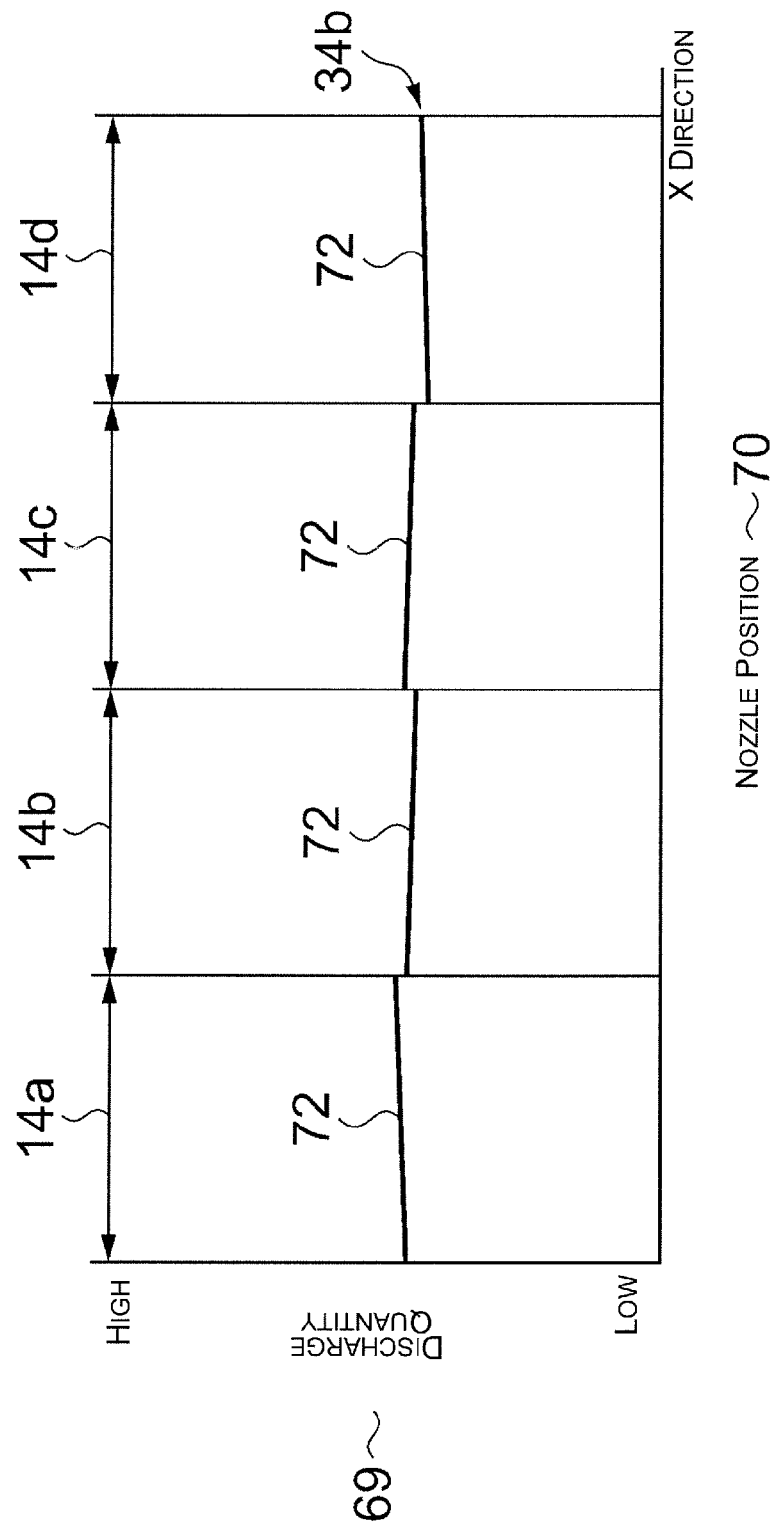
FIG. 10 is a graph showing an approximation line approximating the distribution of the discharge quantity according to the second embodiment.

Next, a characteristic example of performing coating using a droplet discharge device in the present embodiment will be described with reference to FIG. 10. FIG. 10 a graph showing an approximation line approximating the distribution of the discharge quantity. This embodiment differs from the first embodiment in that third nozzle group are used in place of the second nozzle group. A description of the points that are the same as in the first embodiment will be omitted.

In other words, in step S3 of the present embodiment, the worker aligns the droplet discharge heads 14 belonging to the third nozzle group and arranges the groups on the head mounting plate 33 shown in FIG. 2(b). The head unit 34 composed of the droplet discharge heads 14 belonging to the third nozzle group is used as the third nozzle formation 34b. In FIG. 10, the vertical axis shows the discharge quantity 69, and the discharge quantity is greater on the upper side than the lower side. The horizontal axis shows the nozzle positions 70, the right side being the X direction. The approximation line 72 of the first to fourth droplet discharge heads 14a to 14d is expressed by a straight line substantially parallel to the horizontal axis. In this case, the approximation line 72 shows that the difference in discharge quantity 69 between the first droplet discharge head 14a and the second droplet discharge head 14b is reduced. Similarly, the approximation line 72 shows that the difference in discharge quantity 69 between the second droplet discharge head 14b and the third droplet discharge head 14c is reduced, as is the difference between the third droplet discharge head 14c and the fourth droplet discharge head 14d. In other words, the approximation line 72 is substantially parallel to the horizontal axis, and the variance of the discharge quantity 69 is reduced.

In step S5, the functional liquid 37 is coated using the third nozzle formation 34b. Since the third nozzle formation 34b is formed having little variance in the discharge quantity, the functional liquid 37 coated using the third nozzle formation 34b has little variance in thickness. Variance in the thickness of the film solidified in step S7 is also reduced.

The present embodiment as described above has the following effects.

(1) In accordance with the present embodiment, the distribution of the discharge quantity is computed and the droplet discharge heads of the third nozzle group are classified. In the third nozzle formation 34b, the third nozzle groups are disposed adjacent to each other. In such a case, the third nozzle groups have a discharge quantity at the first end portion 14e and a discharge quantity at the second end portion 14f that are substantially the same. In other words, nozzle groups having substantially the same discharge quantity are provided. Therefore, variance in the thickness of the film can be reduced because the thickness of the coated functional liquid is substantially the same.

Third Embodiment

Figure 11:
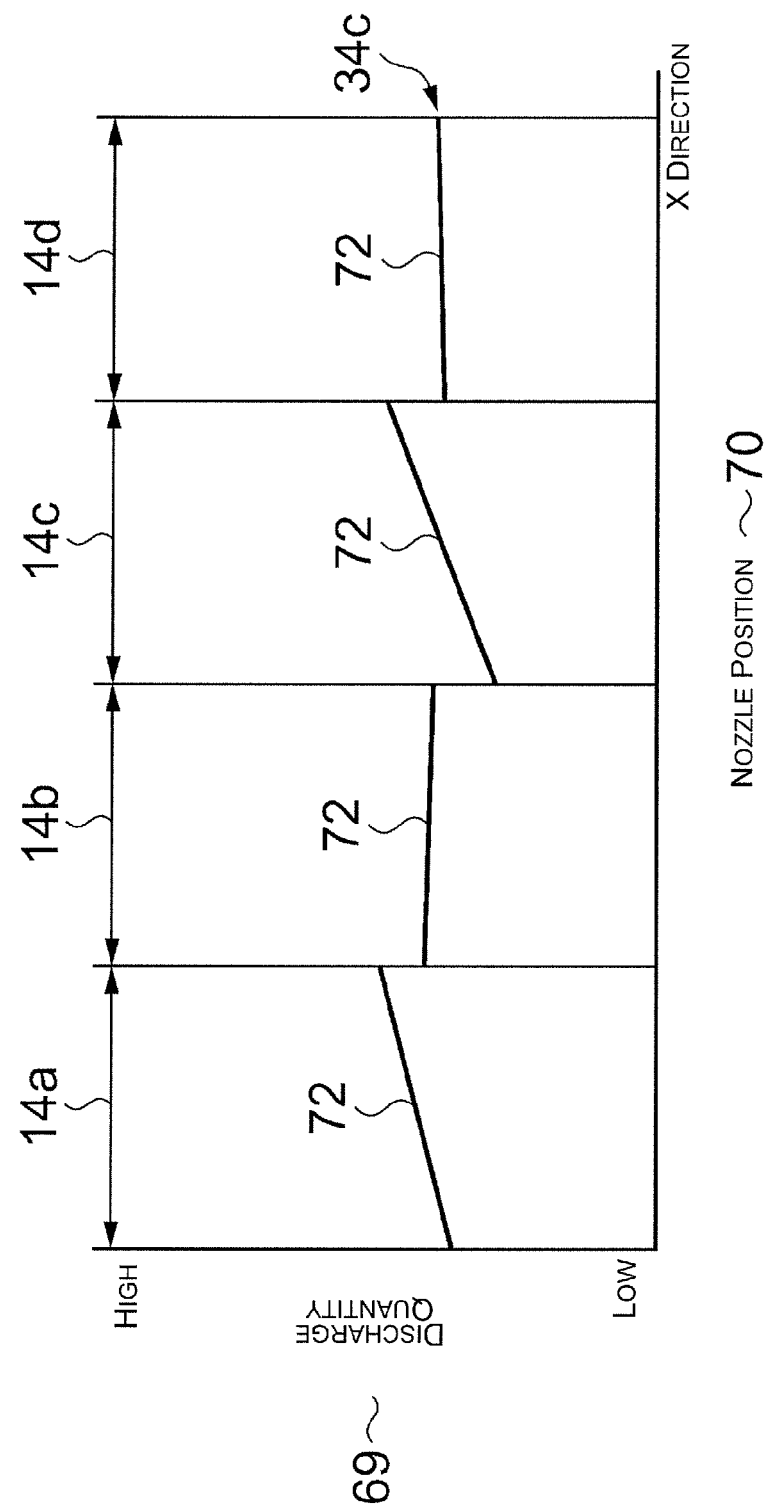
FIG. 11 is a graph showing an approximation line approximating the distribution of the discharge quantity according to the third embodiment.

Next, a characteristic example of performing coating using a droplet discharge device in the present embodiment will be described with reference to FIG. 11. FIG. 11 a graph showing an approximation line approximating the distribution of the discharge quantity. This embodiment differs from the first embodiment in that the droplet discharge heads of third nozzle group are used in addition to the second nozzle group. A description of the points that are the same as in the first embodiment will be omitted.

In other words, in step S3 of the present embodiment, the worker aligns the droplet discharge heads 14 belonging to the first nozzle group and the third nozzle group, and arranges the groups on the head mounting plate 33 shown in FIG. 2(b). The head unit 34 composed of the droplet discharge heads 14 belonging to the first nozzle group and the third nozzle group is used as a fourth nozzle formation 34c. In FIG. 11, the vertical axis shows the discharge quantity 69, and the discharge quantity is greater on the upper side than the lower side. The horizontal axis shows the nozzle positions 70, the right side being the X direction. The approximation line 72 of the first to fourth droplet discharge heads 14a to 14d is composed of a straight line upward to the right and a straight line substantially parallel to the X-axis. In this case, the approximation line 72 shows that there is a difference in discharge quantity 69 among the droplet discharge heads 14, i.e., first to fourth droplet discharge heads 14a to 14d.

In step S5, the functional liquid 37 is coated using the fourth nozzle formation 34c. In the fourth nozzle formation 34c, some of the droplet discharge heads 14 of the first nozzle group are sometimes disposed adjacent to each other. In such a case, the functional liquid 37 flows in locations in which locations having a high discharge quantity 69 and locations having a low discharge quantity 69 are disposed adjacent to each other in the same manner as in the first embodiment, and the coating quantity is therefore averaged out. Similarly, the droplet discharge heads 14 of the first nozzle group and the droplet discharge heads 14 of the third nozzle group are sometimes disposed adjacent to each other. In this case, the functional liquid 37 flows in locations in which locations having a high discharge quantity 69 and locations having a near average discharge quantity 69 are disposed adjacent to each other, and the coating quantity is therefore averaged out. The functional liquid 37 flows in locations in which locations having a low discharge quantity 69 and locations having a near average discharge quantity 69 are disposed adjacent to each other, and the coating quantity is therefore averaged out. The droplet discharge heads 14 of some of the droplet discharge heads 14 of the third nozzle group are sometimes disposed adjacent to each other. In such a case, variance in the coating quantity is reduced in the same manner as in the second embodiment. Therefore, variance in the film thickness is reduced because the coating quantity is averaged out. Variance in the thickness of the film solidified in step S7 is also reduced.

The present embodiment as described above has the following effects.

(1) In accordance with the present embodiment, the functional liquid 37 is discharged from the nozzles 26 of the fourth nozzle formation 34c. The discharged functional liquid spreads on the workpiece. The droplet discharge heads 14 are disposed so that a location having a high discharge quantity and a location having a low discharge quantity, or a location in which the discharge quantity is substantially intermediate are disposed adjacent to each other. In this case, the surface tension of the functional liquid 37 has an effect whereby the functional liquid 37 coated in a high discharge quantity flows to locations coated with a low discharge quantity, or to locations in which the discharge quantity is nearly average. In the case that coating is performed using the fourth nozzle formation 34c, the functional liquid 37 coated in a high discharge quantity similarly flows to locations coated with a low discharge quantity or to locations in which the discharge quantity is intermediate. Therefore, the variance of the thickness can be reduced because the thickness of the coated functional liquid 37 is averaged out.

Fourth Embodiment

Figure 12:
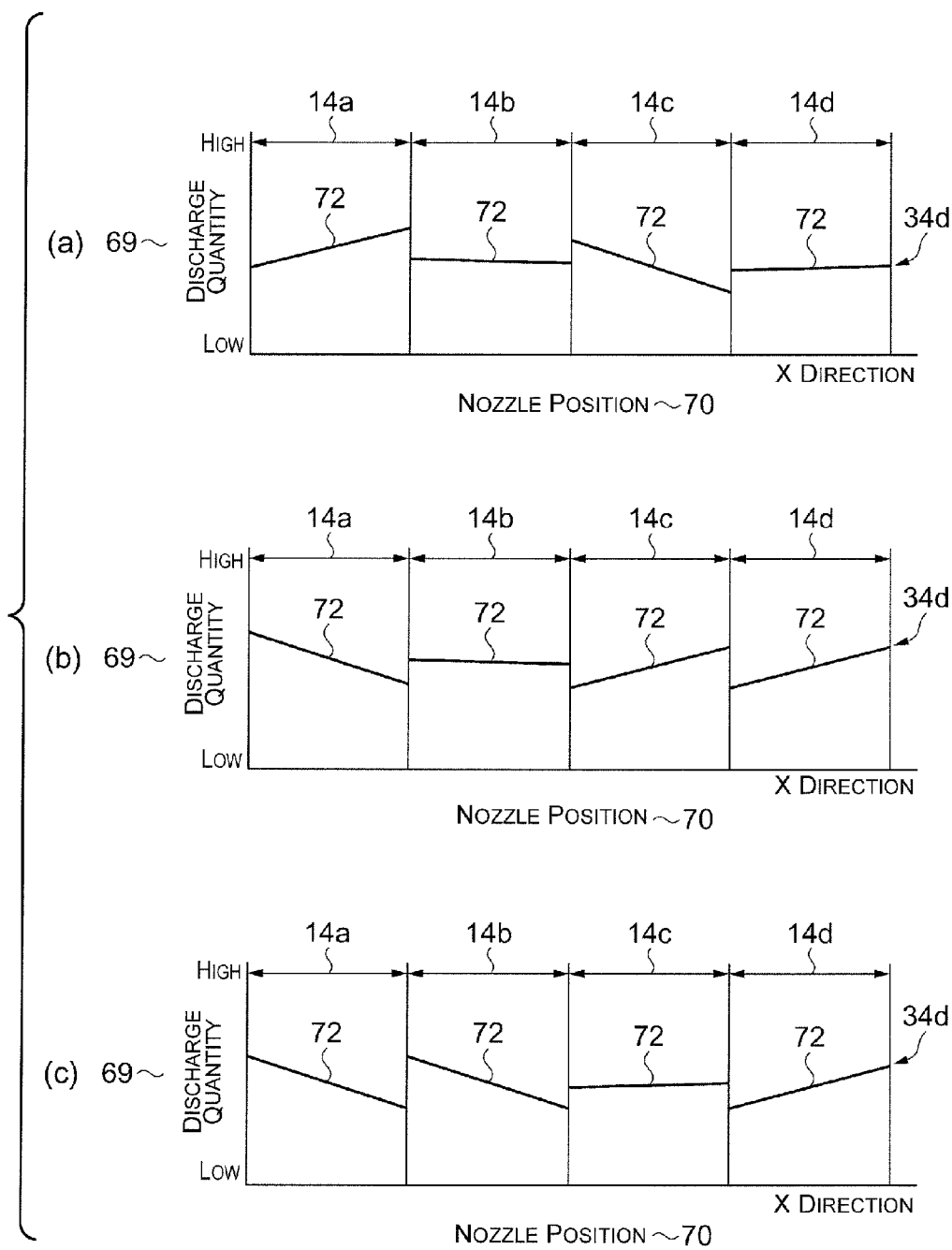
FIG. 12 includes a plurality of graphs (a) to (c) showing an approximation line approximating the distribution of the discharge quantity according to the fourth embodiment.

Next, a characteristic example of performing coating using a droplet discharge device in the present embodiment will be described with reference to FIG. 12. FIG. 12 a graph showing an approximation line approximating the distribution of the discharge quantity. This embodiment differs from the first embodiment in that second nozzle group and third nozzle group are used in addition to the first nozzle group. A description of the points that are the same as in the first embodiment will be omitted.

In other words, in step S3 of the present embodiment, the worker aligns the droplet discharge heads 14 belonging to the first nozzle group, the second nozzle group, and the third nozzle group, and arranges the groups on the head mounting plate 33 shown in FIG. 2(b). The head unit 34 composed of the first nozzle group, the second nozzle group, and the third nozzle group is used as a sixth nozzle formation 34d. In FIGS. 12(a) to 12(c), the vertical axis shows the discharge quantity 69, and the discharge quantity is greater on the upper side than the lower side. The horizontal axis shows the nozzle positions 70, the right side being the X direction.

In FIG. 12(a), the droplet discharge heads 14 belonging to the first nozzle group, third nozzle group, second nozzle group, and third nozzle groups are arranged in the droplet discharge heads 14 of the first to fourth droplet discharge heads 14a to 14d. Since the droplet discharge heads 14 belonging to the first nozzle group and the droplet discharge heads 14 belonging to the third nozzle group are disposed adjacent to each other when the fluid is applied using the sixth nozzle formation 34d, the thickness of the functional liquid 37 thus coated is averaged out in the same manner as in the third embodiment. Similarly, the thickness of the functional liquid 37 thus coated is averaged out in the same manner as in the third embodiment in locations in which the droplet discharge heads 14 belonging to the second nozzle group and the droplet discharge heads 14 belonging to the third nozzle group are disposed adjacent to each other. Therefore, the variance of the thickness is reduced because the coating quantity is averaged out when the sixth nozzle formation 34d is used to coat the fluid.

In FIG. 12(b), the droplet discharge heads 14 belonging to the second nozzle group, third nozzle group, first nozzle group, and first nozzle group are arranged in the droplet discharge heads 14 of the first to fourth droplet discharge heads 14a to 14d. Since the droplet discharge heads 14 belonging to some of the droplet discharge heads 14 belonging to the first nozzle group are disposed adjacent to each other when the fluid is applied using the sixth nozzle formation 34d, the thickness of the functional liquid 37 thus coated is averaged out in the same manner as in the first embodiment. The thickness of the functional liquid 37 thus coated is averaged out in the same manner as in the third embodiment in locations in which the droplet discharge heads 14 belonging to the first nozzle group and the second nozzle group, and the droplet discharge heads 14 belonging to the third nozzle group are disposed adjacent to each other. Therefore, the variance of the thickness is reduced because the coating quantity is averaged out when the sixth nozzle formation 34d is used to coat the fluid.

In FIG. 12(c), the droplet discharge heads 14 belonging to the second nozzle group, second nozzle group, third nozzle group, and first nozzle group are arranged in the droplet discharge heads 14 of the first to fourth droplet discharge heads 14a to 14d. The droplet discharge heads 14 belonging to the second nozzle group and the droplet discharge heads 14 belonging to the second nozzle group are disposed adjacent to each other when the fluid is applied using the sixth nozzle formation 34d. In this case as well, the thickness of the functional liquid 37 thus coated is averaged out in the same manner as in the first embodiment. The thickness of the functional liquid 37 thus coated is averaged out in the same manner as in the third embodiment in locations in which the droplet discharge heads 14 belonging to the first nozzle group and the second nozzle group, and the droplet discharge heads 14 belonging to the third nozzle group are disposed adjacent to each other. Therefore, the variance of the thickness is reduced because the coating quantity is averaged out when the sixth nozzle formation 34d is used to coat the fluid.

The present embodiment as described above has the following effects.

(1) In accordance with the present embodiment, there are cases in which the droplet discharge heads 14 of the first nozzle group are disposed adjacent to each other, cases in which the droplet discharge heads 14 of the second nozzle group are disposed adjacent to each other, and cases in which the droplet discharge heads 14 of the first nozzle group or the second nozzle group are disposed adjacent to the droplet discharge heads 14 of the third nozzle group. The functional liquid coated in a high discharge quantity flows to locations coated with a low discharge quantity or to locations in which the discharge quantity is substantially intermediate. Therefore, variance in the thickness of the film can be reduced because the thickness of the coated functional liquid is averaged out.

Fifth Embodiment

Next, a characteristic example of performing coating using a droplet discharge device in the present embodiment will be described with reference to FIG. 13. FIG. 13 is a graph showing the distribution of the discharge quantity. This embodiment differs from the first embodiment in that the integral of the discharge quantity is computed in place of the approximation formula. A description of the points that are the same as in the first embodiment will be omitted.

In other words, in the present embodiment, the distribution of the discharge quantity is measured in step S1. FIGS. 13(a) to 13(c) show examples of the distribution of the discharge quantity. In FIGS. 13(a) to 13(c), the vertical axis shows the discharge quantity 69, and the discharge quantity is greater on the upper side than the lower side. The horizontal axis shows the nozzle positions 70 with the aid of nozzle numbers. The nozzle numbers are assigned from the first end portion 14e toward the second end portion 14f. The measured values 71 of the discharge quantity 69 in relation to the first to fifteenth nozzle positions 70 are plotted. The computed value in which the discharge quantity 69 in relation to the first to seventh nozzle positions 70 is integrated is used as a first integral value 91. Similarly, the computed value in which the discharge quantity 69 in relation to the ninth to fifteenth nozzle positions 70 is integrated is used as a second integral value 92. The value obtained by subtracting the first integral value 91 from the second integral value 92 is used as the discharge difference index.

In step S2, the CPU 43 classifies the droplet discharge heads 14 into first to third nozzle groups using the discharge difference index. In FIG. 13(a), since the second integral value 92 has a greater discharge quantity 69 than does the first integral value 91, the discharge difference index is a positive value. The droplet discharge heads 14 is classified into the first nozzle group. In FIG. 13(b), since the discharge quantities 69 of the first integral value 91 and the second integral value 92 are substantially the same, the discharge difference index is a value close to zero. The droplet discharge heads 14 are classified into the third nozzle group. In FIG. 13(c), since the first integral value 91 has a discharge quantity 69 that is greater than that of the second integral value 92, the discharge difference index is a negative value. The droplet discharge heads 14 is classified into the third nozzle group. The steps following step S3 are carried out in the same manner as the first embodiment.

When the first to third nozzle group is classified, the threshold of the discharge difference index is determined in advance. The threshold for classifying the first nozzle group and the third nozzle group is set as the first threshold, and the threshold for classifying the second nozzle group and the third nozzle group is set as the second threshold. The discharge difference index of the droplet discharge heads 14 is compared with the threshold, and droplet discharge heads 14 in which the discharge difference index is greater than the first threshold is classified as the first nozzle group. Similarly, the droplet discharge heads 14 in which the discharge difference index is less than the second threshold are classified as the second nozzle group, and the droplet discharge heads 14 in which the discharge difference index is between the first threshold and the second threshold are classified as the third nozzle group.

The present embodiment as described above has the following effects.

(1) In accordance with the present embodiment, the first integral value 91 and the second integral value 92 are computed. The discharge difference index is computed by subtracting the first integral value 91 from the second integral value 92. The droplet discharge heads 14 are classified into first to third nozzle groups by using the discharge difference index. The computation can be completed in a short period of time because a simple method is used. As a result, classification can be carried out with good productivity.

Sixth Embodiment

Next, a characteristic example of performing coating using a droplet discharge device in the present embodiment will be described with reference to FIG. 14. FIG. 14(a) is a schematic perspective view showing the configuration of a droplet discharge head. FIG. 14(b) a schematic plan view showing the droplet discharge head. FIG. 14(c) is a schematic side view showing the droplet discharge head. This embodiment differs from the first embodiment in that the droplet discharge heads 14 are symmetrically formed. A description of the points that are the same as in the first embodiment will be omitted.

In other words, in the present embodiment, droplet discharge heads 94 are provided with a nozzle plate 25 in which nozzles 26 are formed, as shown in FIG. 14(a). A first casing 95 is formed below the nozzle plate 25, and the cavity 36 shown in FIG. 2(c) is formed inside the first casing 95. A second casing 96 is formed below the first casing 95, and a flow channel in communication with the cavity 36, a piezoelement 39, and other components are formed inside the second casing 96. A mounting hole 96a is formed in the upper surface of the second casing 96, and a female thread is formed in the mounting hole 96a.

A circuit board 97 is disposed on an intermediate step of the second casing 96, and the board is formed so as to extend in the X direction form the two side surfaces of the second casing 96. A pair of connectors 98 is disposed on the lower surface of the circuit board 97, and the connectors 98 and the piezoelement 39 are electrically connected via wires formed on the circuit board 97.

A pair of supply ports 99 is formed in protruding manner below the second casing 96. A tube (not shown) is connected to the supply ports 99, and a functional liquid 37 supplied through the tube is then supplied to the cavity 36 via the flow channel formed inside the second casing 96. The droplet discharge heads 94 are symmetrically formed in the X and Y directions, and can be used by being rotated 180° about the centerline 94a in the Z direction.

FIGS. 14(b) and 14(c) show the droplet discharge heads 94 mounted on the head mounting plate 33. The droplet discharge heads 94 are secured to the head mounting plate 33 via a first support plate 100 and a second support plate 101. Since the droplet discharge heads 94, the first support plate 100, the second support plate 101, and the head mounting plate 33 are secured by a screw 102, the droplet discharge heads 94 can be dismounted by removing the screw 102. A hole portion 33a is formed in the head mounting plate 33, and the hole portion 33a is formed to a size that allows the circuit board 97 to be provided. The droplet discharge heads 94 can be positioned by being rotated 180° about the centerline 94a.

In step S3 of the first embodiment, the distribution of the discharge quantity can be changed by rotating the classified droplet discharge heads 94 about the centerline 94a. For example, the droplet discharge heads 94 classified as first nozzle group can be switched to second nozzle group by replacing the first nozzle 26 of the first end portion with the fifteenth nozzle 26 of the second end portion. Similarly, the droplet discharge heads 94 classified as second nozzle group can be switched to first nozzle group. The droplet discharge heads 94 in which the first nozzle group and the second nozzle group coexist can be aligned with first nozzle group. The steps following step S4 can be carried out thereafter.

The present embodiment as described above has the following effects.

(1) In accordance with the present embodiment, all of the droplet discharge heads 94 in which the first nozzle group and the second nozzle group coexist can be used as the first nozzle formation 34a composed of the first nozzle group. Similarly, all of the droplet discharge heads 94 can be used as a second nozzle formation composed of the second nozzle group. As a result, the first nozzle formation 34a or the second nozzle formation can be formed in a simple manner.

Seventh Embodiment

Figure 15:
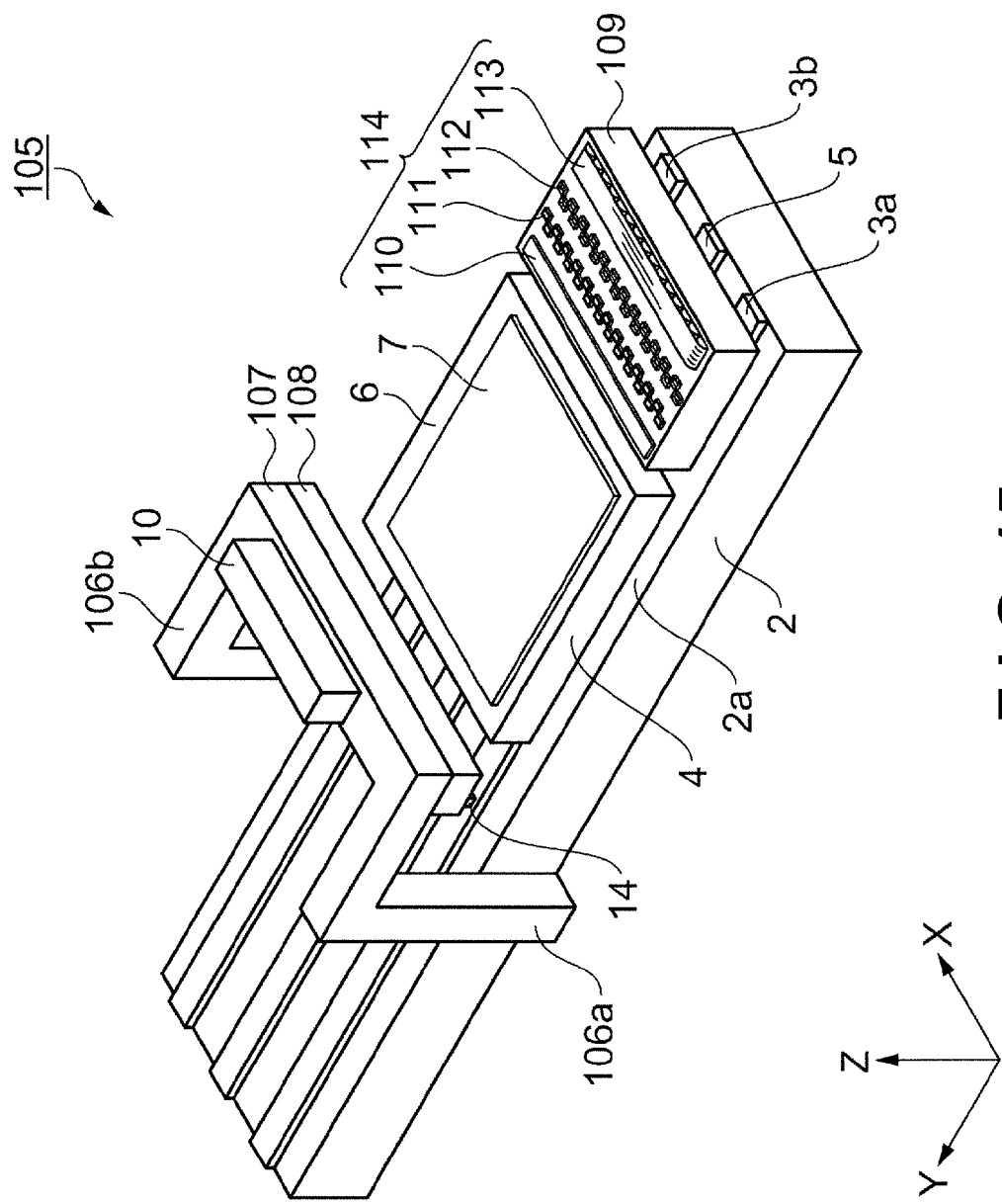
FIG. 15 is a schematic perspective view showing the configuration of a droplet discharge device according to a seventh embodiment.

Next, a characteristic example a droplet discharge device in the present embodiment will be described with reference to FIG. 15. FIG. 15 is a schematic perspective view showing the configuration of a droplet discharge head. This embodiment differs from the first embodiment in that the droplet discharge heads 14 are disposed across the length that is equal to or greater than that of the substrate 7. A description of the points that are the same as in the first embodiment will be omitted.

In other words, in the present embodiment, a droplet discharge device 105 is provided with a base 2, as shown in FIG. 15. A stage 4 that can move in the Y direction is disposed on the upper side of the base 2.

A pair of supports 106a, 106b is erectly provided to the two sides in the X-axis direction of the base 2, and a bridge member 107 extending in the X-axis direction is provided to the pair of supports 106a, 106b so as to span the supports. A head unit 108 is disposed below the bridge member 107, and a plurality of droplet discharge heads 14 is disposed on the lower surface of the head unit 108. The droplet discharge heads 14 is disposed across the entire width of the head unit 108 in a staggered fashion. The droplet discharge heads are disposed so that the width which can be coated by discharge from the droplet discharge heads 14 is greater than the width of the substrate 7. Therefore, the functional liquid 37 can be applied to the entire surface of the substrate 7 by moving the stage 4 in the Y direction and discharging droplets 40 from the droplet discharge heads 14.

A maintenance stage 109 that can move in the Y direction is positioned on the base 2. A cleaning unit 114 composed a flushing unit 110, a weight measurement device 111, a capping unit 112, a wiping unit 113, and other components is disposed on the upper surface of the maintenance stage 109. The cleaning unit 114 is disposed so as to correspond to the droplet discharge heads 14. Therefore, the droplet discharge heads 14 can be maintained without moving the droplet discharge heads 14 in the X direction.

The present embodiment as described above has the following effects.

(1) In accordance with the present embodiment, the droplet discharge device 105 moves the stage 4 in the Y direction, and the functional liquid 37 is discharged from the nozzles 26 of the droplet discharge heads 14, whereby the functional liquid 37 can be coated into areas intended for coating. Therefore, the droplet discharge device 105 can coat the functional liquid 37 onto the substrate 7 without moving the nozzles 26 in the X direction. The substrate 7 can be coated using a fewer number of movements of the substrate 7 or the droplet discharge heads 14. As a result, coating can be performed with good productivity.

(2) In accordance with the present embodiment, the droplet discharge device 105 can coat the functional liquid 37 onto the substrate 7 without moving the nozzles 26 in the X direction. In this case, the droplet discharge heads 14 are moved in the direction in which the nozzles 26 are arrayed, and the droplet discharge device 105 can coat the functional liquid 37 onto the substrate 7 without using a line feed. Therefore, the occurrence of streak patterns caused by line feeding the substrate 7 or the droplet discharge heads 14 can be prevented. As a result, a film can be formed with good quality.

Eighth Embodiment

Next, an embodiment for manufacturing a liquid crystal display device in which the discharge method described above is used will be described with reference to FIG. 16.

Described first is a liquid crystal display device, which is a type of electrooptic device provided with a color filter. FIG. 16 is a schematic exploded perspective view showing the structure of a liquid crystal display device.

A liquid crystal device 120 as an electrooptic device is provided with a transmissive liquid crystal panel 121 and an illumination device 123 for illuminating the liquid crystal panel 121, as shown in FIG. 16. The liquid crystal panel 121 is provided with a liquid crystal 122 held between an element substrate 124 and a counter substrate 125. A lower polarizing plate 126 is disposed on the lower surface of the element substrate 124, and an upper polarizing plate 217 is disposed on the upper surface of the counter substrate 125.

The element substrate 124 is provided with a substrate 128 composed of an optically transmissive material, and an insulating film 129 is formed on the upper side of the substrate 128. Pixel electrodes 130 are formed in the form of a matrix on the insulating film 129, and TFT (Thin Film Transistor) elements 131 having a switching function are formed on the pixel electrodes 130. The pixel electrodes 130 are connected to the drain terminals of the TFT elements 131.

Scan lines 132 and data lines 133 are formed in a grid around the pixel electrodes 130 and the TFT elements 131. The scan lines 132 are connected to the gate terminals of the TFT elements 131, and the data lines 133 are connected to the source terminals of the TFT elements 131.

An alignment film 135 is formed on the side of an element layer 134 that faces the liquid crystal 122. The layer is composed of the pixel electrodes 130, TFT elements 131, scan lines 132, data lines 133, and the like.

The counter substrate 125 is provided with a substrate 137 composed of an optically transmissive material. A lower layer bank 138 composed of a light-blocking material is formed in the shape of a grid on the lower side of the substrate 137, and an upper layer bank 139 composed of an organic compound or the like is formed on the lower side of the lower layer bank 138. A partition portion 140 is composed of the lower layer bank 138 and the upper layer bank 139.

Red (R), green (G), and blue (B) color filters 141R, 141G, 141B are formed as a colored layer 141 in the concave portions partitioned in the form of a matrix by the partition portion 140. An overcoat layer 142 is provided for covering the partition portion 140 and the color filters 141R, 141G, 141B. A counter electrode 143 is formed as an electrode film composed of ITO (Indium Tin Oxide) or another transparent electroconductive film so as to cover the overcoat layer 142. An alignment film 144 is formed on side of the counter electrode 143 that faces the liquid crystal 122. Groove-shaped convexities and concavities are formed so as to be arrayed on the alignment film 144 and the alignment film 135, and the liquid crystal 122 is formed so as to be arrayed along the convexities and concavities.

The liquid crystal 122 has a property whereby the slope angle of the liquid crystal 122 changes when a voltage is applied to the counter electrode 143 and the pixel electrodes 130 that hold the liquid crystal 122. The slope angle of the liquid crystal 122 is controlled by adjusting the voltage applied to the liquid crystal 122 with the aid of the switching operation of the TFT elements 131, and each pixel is operated so as to transmit or block light. Naturally, light does not enter pixels in which light is blocked by the liquid crystal 122, and the pixel is therefore black. In this manner, light transmission is controlled for each pixel by operating the liquid crystal 122 as a shutter through the use of the switching operation of the TFT, and an image can be displayed by switching the pixels on and off.

The pixel electrodes 130 are electrically connected to the drain terminals of the TFT elements 131, and pixel signals supplied by the data lines 133 are fed to each pixel electrode 130 at a predetermined timing by setting the TFT in an on state for a fixed length of time. The voltage level of predetermined-level pixel signals supplied to the pixel electrodes 130 in this manner is maintained between the pixel electrodes 130 and the counter electrode 143 of the counter substrate 125, and the amount of light transmitted by the liquid crystal 122 is varied in accordance with the voltage level of the pixel signals.

An illumination device 123 is provided with a light source as well as a light guide plate, a diffusion plate, a reflection plate, or the like that can direct light from the light source toward a liquid crystal display panel 121. A white LED, EL, cold cathode tube, or the like may be used as the light source, and a cold cathode tube is used in the present embodiment.

The lower polarizing plate 126 and the upper polarizing plate 127 may be combined with a phase difference film or another optical functional film used with the aim of improving the visual angle dependency or for another purpose. The liquid crystal display panel 121 is not limited to TFT elements 131 as the active elements, and may be one that uses TFD (Thin Film Diode) elements, or a passive-type liquid crystal display device in which the electrodes constituting the pixels are disposed so as to intersect each other.

An element formation step for forming the pixel electrodes 130, the TFT elements 131, and other element layers 134 on the substrate 128 is carried out as a step for manufacturing the liquid crystal display device 120. Next, an alignment film formation step for forming the alignment film 135 is carried out to complete the element substrate 124. A color filter formation step for forming the colored layer 141 and the overcoat layer 142 on the substrate 137 is also carried out. Next, an electrode formation step for forming the counter electrode 143 on the lower surface of the overcoat layer 142 is carried out. An alignment film formation step for forming the alignment film 144 on the lower surface of the counter electrode 143 is subsequently carried out to complete the counter substrate 125. Next, a liquid crystal arrangement step for coating the liquid crystal 122 on the element substrate 124 is performed. An adhesive is then coated onto the element substrate 124 or the counter substrate 125, after which an assembly step is performed for bonding together the element substrate 124 and the counter substrate 125. Next, a polarizing plate-mounting step for mounting the lower polarizing plate 126 and the upper polarizing plate 127 is performed to complete the liquid crystal display panel 121.

The discharge method according to the first to seventh embodiments is used in the electrode formation step for forming the counter electrode 143 on the lower side of the overcoat layer 142 in the counter substrate 125. Specifically, a fluid material for the electrode film is manufactured as the electrode formation material by dissolving the material of the counter electrode 143 in a solvent or dispersing the material in a dispersion medium. Next, the fluid material for the electrode film is discharged onto the surface of the overcoat layer 142 using the droplet discharge device 1.

In this case, the discharge and distribution of the droplet discharge heads 14 or the droplet discharge heads 94 are coordinated via the same steps as the distribution computation step, classification step, and nozzle formation step in the first to seventh embodiments, after which the fluid material for the electrode film is discharged and coated onto a workpiece. The fluid material for the coated electrode film is thereafter heated, dried, and solidified to thereby form the counter electrode 143.

The discharge method according to the first to seventh embodiments is used in the alignment film formation step for forming the alignment film 144 on the lower side of the counter electrode 143 in the counter substrate 125. Specifically, a fluid material for the alignment film is manufactured as the liquid crystal alignment film formation composition by dissolving the material of the alignment film 144 in a solvent or dispersing the material in a dispersion medium. Next, the fluid material for the alignment film is discharged onto the surface of the counter electrode 143 using the droplet discharge device 1.

In this case, the discharge and distribution of the droplet discharge heads 14 or the droplet discharge heads 94 are coordinated via the same steps as the distribution computation step, classification step, and nozzle formation step in the first to seventh embodiments, after which the fluid material for the electrode film is discharged and coated onto a workpiece. The fluid material for the coated electrode film is thereafter heated, dried, and solidified to thereby form the alignment film 144.

The discharge method according to the first to seventh embodiments is used in the alignment film formation step for forming the alignment film 135 on the upper side of the element layer 134 in the element substrate 124. Specifically, a fluid material for the alignment film is manufactured as the liquid crystal alignment film formation composition by dissolving the material of the alignment film 135 in a solvent or dispersing the material in a dispersion medium. Next, the fluid material for the alignment film is discharged onto the surface of the element layer 134 using the droplet discharge device 1.

In this case, the discharge and distribution of the droplet discharge heads 14 or the droplet discharge heads 94 are coordinated via the same steps as the distribution computation step, classification step, and nozzle formation step in the first to seventh embodiments, after which the fluid material for the electrode film is discharged and coated onto a workpiece. The fluid material for the coated alignment film is thereafter heated, dried, and solidified to thereby form the alignment film 135.

The present embodiment as described above has the following effects.

(1) In accordance with the present embodiment, variance in the thickness in which the material of the alignment film is coated is reduced by using the discharge method according to the first to seventh embodiments in the steps for manufacturing the alignment films 135, 144. Therefore, alignment films 135, 144 having a low thickness variance can be manufactured.

(2) In accordance with the present embodiment, variance in the thickness in which the electrode material is coated is reduced by using the discharge method according to the first to seventh embodiments in the steps for manufacturing the counter electrode 143. Therefore, a counter electrode 143 having a low thickness variance can be manufactured.

(3) In accordance with the present embodiment, variance in the thickness of the alignment films 135, 144 and the counter electrode 143 is reduced. Therefore, the liquid crystal 122 faithfully responds to drive signals and in which a liquid crystal screen that can be comfortably viewed can be formed.

Ninth Embodiment

Next, an electronic apparatus provided with the liquid crystal display device 120 of the eighth embodiment will be described. FIG. 17 is a schematic perspective view showing an example in which the liquid crystal display device is mounted in a personal computer. The main body of a personal computer 150 as an electronic apparatus is provided with a display device 151 in the display unit for displaying information, as shown in FIG. 17. The liquid crystal display device 120 manufactured is the eighth embodiment is disposed in the display device 151. The display device 151 disposed in the personal computer 150 is manufactured using the embodiments described above, and the alignment films 135, 144 and the counter electrode 143 in the display device 151 are formed having low variance in thickness. Therefore, the personal computer 150 is an electronic apparatus provided with a display unit having a display device 151 in which the liquid crystal 122 faithfully responds to drive signals and in which the liquid crystal screen can be comfortably viewed.

The present invention is not limited to the embodiments described above, and various modifications and improvements can be made. Modified examples are described below.

Modified Example 1

In the first embodiment, the first nozzle formation 34*a* is configured using the droplet discharge heads 14 of the first nozzle group. Similarly, a fluid may be coated using a second nozzle formation composed of the droplet discharge heads 14 of the second nozzle group. The same effect can be obtained because the first nozzle formation 34*a* and the second nozzle formation differ only in the orientation of the serrated shape of the distribution of the discharge quantity. The fifth to eighth embodiments may be applied in a method that uses the droplet discharge heads 14 of the second nozzle group. The same effects can be obtained.

Modified Example 2

In the third embodiment, the functional liquid 37 was discharged and coated on a workpiece using a fourth nozzle formation 34*c* composed of the droplet discharge heads 14 of the first nozzle group and the third nozzle group. Similarly, the functional liquid 37 may be discharged and coated on a workpiece using a fifth nozzle formation composed of the droplet discharge heads 14 of the second nozzle group and the third nozzle group. In this case as well, the same effect can be obtained by performing the same steps as those of the first embodiment. This modified example may be applied to the fourth to eighth embodiments as well. Similar effects can be obtained.

Modified Example 3

In the first embodiment, the discharge step of step S5 and the subsequent planarization step of step S6 were carried out. Step S5 and step S6 may be carried out simultaneously. For example, when the viscosity of the functional liquid 37 is low and the liquid spreads out readily, the discharge of the functional liquid 37 and the step for spreading the discharged functional liquid 37 proceed simultaneously. In this case, step S6 is carried out at the same time as step S5. Since manufacturing in this case requires less time in comparison with the case in which step S6 is carried out separately, manufacturing can be carried out with good productivity. This modified example can be applied to the second to eighth embodiments and to modified examples 1 and 2. The same effects can be obtained.

Modified Example 4

In the first embodiment, the nozzles 26 were formed so as to be arrayed in a single row in the droplet discharge heads 14. The array of nozzles 26 may have two rows or more. In this case as well, the nozzles of two nozzle rows are grouped as nozzle group and are classified into first to third nozzle group. In this case as well, the same steps are performed as those in the first embodiment, and the same effects can be obtained. This modified example can be applied to the second to eighth embodiments and to modified examples 1 and 2. The same effects can be obtained.

Modified Example 5

In the fifth embodiment, points of difference from the first embodiment were described. The fifth embodiment can be applied to the second to fourth embodiments and to modified examples 1 and 2. The same effects can be obtained.

Modified Example 6

In the sixth embodiment, points of difference from the first embodiment were described. The sixth embodiment can be applied to the second and fourth embodiments and to modified examples 1 and 2. The same effects can be obtained.

Modified Example 7

In the seventh embodiment, points of difference from the first embodiment were described. The seventh embodiment can be applied to the second and fourth embodiments and to modified examples 1 and 2. The same effects can be obtained.

Modified Example 8

In the eighth embodiment, a method using the first to seventh embodiments was described. The eighth embodiment can be applied to modified examples 1 and 2 as well. The same effects can be obtained.

Modified Example 9

In the third embodiment, the droplet discharge heads 14 of the first nozzle group, third nozzle group, first nozzle group, and third nozzle group are arranged in sequence of the first to fourth droplet discharge heads 14*a* to 14*d*, but not limitation is imposed thereby. The sequence may be the first nozzle group, first nozzle group, third nozzle group, and third nozzle group, or the sequence may be the third nozzle group, third nozzle group, third nozzle group, and first nozzle group. Any combination of the first nozzle group and the third nozzle group can be used. The same effects can be obtained.

Modified Example 10

In the first to fifth embodiments, four droplet discharge heads 14 are disposed in the head unit 34, but two or more head units 34 may be used.

Modified Example 11

In the first to fifth embodiments, a piezoelement 39 was used as pressure application means for applying pressure to the cavity 36, but another method may be used. For example, a coil and magnet may be used to cause the vibration plate 38 to deform and apply pressure. Additionally, a heater wire may be disposed inside the cavity 36, and the heater wire may be heated to thereby vaporize the functional liquid 37 or cause a gas containing the functional liquid 37 to expand and apply pressure. Also, electrostatic attraction and repulsion may be used to cause the vibration plate 38 to deform and apply pressure.

Modified Example 12

In the ninth embodiment, a liquid crystal display device 120 was used in the display unit of a personal computer 150, but no limitation is imposed thereby. Advantageous application can also be made to electronic books, mobile phones, digital still cameras, liquid crystal televisions, view finder-type and direct-view monitor-type video tape recorders, car navigation devices, pagers, electronic assistants, electronic calculators, word processors, work stations, videophones, POS terminals, touch panels, and the image display means of other electronic apparatuses. In any of these cases, it is possible to obtain an electronic apparatus provided with a liquid crystal display device 120 formed in the display unit so that the variance in film thickness is low.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A discharge method for discharging a fluid from a plurality of droplet discharge heads on a carriage onto a workpiece with each of the droplet discharge heads having a plurality of nozzles arrayed between a first end portion and a second end portion of each of the droplet discharge heads, the method comprising:
measuring a discharge quantity of the fluid from each of the nozzles of each of the droplet discharge heads including a first droplet discharge head and a second droplet discharge head, and determining a distribution characteristic of each of the droplet discharge heads including the first and second droplet discharge heads based on discharge quantities of the fluid from the nozzles in each of the droplet discharge heads;
arranging on the carriage the first and second droplet discharge heads such that the first and second droplet discharge heads are arranged adjacent to each other in a direction in which the nozzles are arrayed, such that the second end portion of the first droplet discharge head is closer to the first end portion of the second droplet discharge head than to the second end portion of the second droplet discharge head on the carriage, and such that all of the droplet discharge heads including the first and second droplet discharge heads arranged on the carriage have the same distribution characteristic that is indicated by the same distribution characteristic line, which is one of
a first distribution characteristic line indicating that the discharge quantity at the second end portion is greater than the discharge quantity at the first end portion, and
a second distribution characteristic line indicating that the discharge quantity at the first end portion is greater than the discharge quantity at the second end portion,
a first end point of the same distribution characteristic line that indicates the same distribution characteristics of the second droplet discharge head being different from a second end point of the same distribution characteristic line that indicates the same distribution characteristic of the first droplet discharge head, the first end point corresponding to the first end portion of the second droplet discharge head, the second end point corresponding to the second end portion of the first droplet discharge head;
discharging the fluid onto the workpiece by using the selected droplet discharge heads; and
planarizing the discharged fluid by leaving the discharged fluid to stand on the workpiece,
the arranging of the first and second droplet discharge heads on the carriage being performed after the distribution characteristic of each of the droplet discharge heads including the first and second droplet discharge heads is determined.

2. The discharge method according to claim 1, wherein
the determining of the distribution characteristic includes computing the distribution characteristic by a first-order approximation formula using a method of least squares and comparing the discharge quantities at the first end portion and the second end portion.

3. The discharge method according to claim 1, wherein
the selecting of the droplet discharge heads includes comparing the discharge quantity discharged from the nozzles on a side of the first end portion and the discharge quantity discharged from the nozzles on a side of the second end portion.

4. The discharge method according to claim 1, further comprising
reversing the first end portion and the second end portion of each of the droplet discharge heads that have the same distribution characteristic indicated by the second distribution characteristic line so that the droplet discharge heads that have the same distribution characteristic indicated by the second distribution characteristic line are used as the droplet discharge heads that have the same distribution characteristic indicated by the first distribution characteristic line, and reversing the first end portion and the second end portion of each of the droplet discharge heads that have the same distribution characteristic indicated by the first distribution characteristic line so that the droplet discharge heads that have the same distribution characteristic indicated by the first distribution characteristic line are used as the droplet discharge heads that have the same distribution characteristic indicated by the second distribution characteristic line.

5. The discharge method according to claim 1, further comprising
providing a head unit with a plurality of the droplet discharge heads, and
replacing the head unit as a whole when a replacement of one of the droplet discharge heads is required.

6. The discharge method according claim 1, wherein
The discharging the fluid onto the workpiece includes combining a prescribed number of the droplet discharge heads so that a length of the nozzles of the droplet discharge heads is equal to or greater than a width of an area in which the fluid is to be coated on the workpiece.

7. The discharge method according to claim 5, wherein
the providing of the head unit with the droplet discharge heads includes disposing the droplet discharge heads in a staggered fashion in the head unit.

8. A continuous film formation method comprising:
discharging the fluid for forming the continuous film onto the workpiece using the discharge method according to claim 1; and
solidifying the fluid discharged onto the workpiece to form the continuous film.

9. An alignment film formation method comprising:
discharging the fluid including a liquid crystal alignment film formation composition onto a substrate as the workpiece using the discharge method according to claim 1; and
solidifying the liquid crystal alignment film formation composition discharged onto the substrate to form the alignment film.

10. A method for forming a liquid crystal display device comprising:
forming the alignment film on the substrate and an additional substrate using the alignment film formation method according to claim 9; and
disposing a liquid crystal between the substrate and the additional substrate.

* * * * *